US012791664B2

(12) United States Patent
Liu et al.

(10) Patent No.: US 12,791,664 B2
(45) Date of Patent: Nov. 10, 2026

(54) GESTURE RECOGNITION METHOD AND APPARATUS

(71) Applicant: HUAWEI TECHNOLOGIES CO., LTD., Shenzhen (CN)

(72) Inventors: Xian Liu, Shenzhen (CN); Zhiwei Yi, Chengdu (CN); Junjie Wu, Chengdu (CN); Tao Hu, Beijing (CN); Han Jiang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 379 days.

(21) Appl. No.: 18/211,478

(22) Filed: Jun. 19, 2023

(65) Prior Publication Data

US 2023/0333209 A1 Oct. 19, 2023

Related U.S. Application Data

(63) Continuation of application No. PCT/CN2021/132402, filed on Nov. 23, 2021.

(30) Foreign Application Priority Data

Dec. 22, 2020 (CN) ......................... 202011528107.5

(51) Int. Cl.
*G01S 7/41* (2006.01)
*G06F 3/01* (2006.01)

(52) U.S. Cl.
CPC .............. *G01S 7/415* (2013.01); *G06F 3/017* (2013.01)

(58) Field of Classification Search
CPC ........ G01S 7/415; G01S 13/584; G01S 7/356; G01S 13/88; G01S 13/343; G01S 7/417;
(Continued)

(56) References Cited

U.S. PATENT DOCUMENTS 11,301,672 B2 * 4/2022 Gurbuz .................. G06V 40/28
2011/0222726 A1 * 9/2011 Ruan ...................... G06V 40/28
382/103

(Continued)

FOREIGN PATENT DOCUMENTS

CN 106203380 A 12/2016
CN 106354259 A 1/2017

(Continued)

OTHER PUBLICATIONS

Farhana Thariq Ahmed H, Ahmad H, Phang SK, Vaithilingam CA, Harkat H, Narasingamurthi K. Higher Order Feature Extraction and Selection for Robust Human Gesture Recognition using CSI of COTS Wi-Fi Devices. Sensors. 2019; 19(13):2959. https://doi.org/10.3390/s19132959 (Year: 2019).*

(Continued)

*Primary Examiner* — Resha Desai
*Assistant Examiner* — Peter Davon Doze
(74) *Attorney, Agent, or Firm* — WOMBLE BOND DICKINSON (US) LLP

(57) ABSTRACT

This application discloses a gesture recognition method and apparatus accurately recognizes a gesture of a user and improves user experience. The method includes: obtaining echo data of a radar, where the echo data includes information generated when an object moves in a detection range of the radar; filtering out, from the echo data, information that does not meet a preset condition, to obtain gesture data, where the preset condition includes at least two of a distance, a speed, or an angle, the distance includes a distance between the object and the radar, the speed includes a speed of the object relative to the radar, and the angle includes an azimuth or a pitch angle of the object in the detection range of the radar; extracting a feature from the gesture data, to obtain gesture feature information; and obtaining a target gesture based on the gesture feature information.

20 Claims, 24 Drawing Sheets

(58) Field of Classification Search
CPC . G06F 3/017; G06F 3/038; B60K 2360/1464; B60K 2360/573; B60K 35/10; B60K 2360/21
See application file for complete search history.

(56) References Cited

U.S. PATENT DOCUMENTS

| | | | | |
|---|---|---|---|---|
| 2018/0046255 | A1* | 2/2018 | Rothera | B60K 35/80 |
| 2018/0307397 | A1* | 10/2018 | Hastings | G06F 3/0484 |
| 2022/0326367 | A1* | 10/2022 | Matuszak | G06V 40/28 |

FOREIGN PATENT DOCUMENTS

| | | | | | |
|---|---|---|---|---|---|
| CN | 107430444 | A | | 12/2017 | |
| CN | 109522826 | A | | 3/2019 | |
| CN | 106155320 | B | * | 4/2019 | G06F 3/017 |
| CN | 109829509 | A | | 5/2019 | |
| CN | 109857251 | A | | 6/2019 | |
| CN | 110450784 | A | | 11/2019 | |
| CN | 110765974 | A | | 2/2020 | |
| CN | 111027458 | A | | 4/2020 | |
| CN | 111274998 | A | * | 6/2020 | G06N 3/045 |
| CN | 111399642 | A | | 7/2020 | |
| CN | 111505632 | A | * | 8/2020 | G01S 13/88 |
| CN | 111580661 | A | * | 8/2020 | G06F 3/013 |
| CN | 111680539 | A | * | 9/2020 | G06N 3/045 |
| EP | 3712809 | A1 | | 9/2020 | |
| JP | 2018518784 | A | * | 7/2018 | G06F 3/0425 |

OTHER PUBLICATIONS

Liu Changjiang et al: "Spectrum-Based Hand Gesture Recognition Using Millimeter-Wave Radar Parameter Measurements", IEEE Access, vol. 7, pp. 79147-79158, XP011732749.

* cited by examiner

GESTURE RECOGNITION METHOD AND APPARATUS

CROSS-REFERENCE TO RELATED APPLICATIONS

This application is a continuation of International Application No. PCT/CN2021/132402, filed on Nov. 23, 2021, which claims priority to Chinese Patent Application No. 202011528107.5, filed on Dec. 22, 2020. The disclosures of the aforementioned applications are hereby incorporated by reference in their entireties.

TECHNICAL FIELD

This application relates to the field of artificial intelligence, and in particular, to a gesture recognition method and apparatus.

BACKGROUND

With development of society and improvement of material life, requirements for human-computer interaction increasingly grow. Currently, interaction between the human and the virtual world usually depends on touch devices such as a keyboard and a mouse. However, a gesture-based action enables a user to exchange information without using an external device. This is efficient and convenient, and brings better experience to the user.

A conventional gesture recognition technology is mainly implemented according to an optical principle. An optical image may clearly indicate a shape of a gesture, but this is much limited. First, effect of an optical camera is poor in strong light or dim light. Second, a line of sight is highly demanded for the optical image. The user needs to act in a specific space for recognition, and no obstacle can exist between the optical camera and a hand of the user. Third, storage costs and computing costs of the optical image are high. In addition, a facial image of the user is usually obtained during gesture recognition according to the optical principle, and there is a large privacy leakage risk in the optical technology.

Therefore, how to implement more accurate gesture recognition that can be widely applied without the privacy leakage risk becomes an urgent problem to be resolved.

SUMMARY

This application provides a gesture recognition method and apparatus, to filter echo data of a radar in a dimension such as a speed, a distance, or an angle, to obtain gesture data with less interference, and accurately recognize a gesture of a user. This can implement more accurate human-computer interaction that can be widely applied without privacy leakage risks, and improve user experience.

In view of this, according to a first aspect, this application provides a gesture recognition method, including: obtaining echo data of a radar, where the echo data includes information generated when an object moves in a detection range of the radar; filtering out, from the echo data, information that does not meet a preset condition, to obtain gesture data, where the preset condition includes a condition corresponding to at least two of a distance, a speed, or an angle, the distance includes a distance between the object and the radar, the speed includes a speed of the object relative to the radar, and the angle includes an azimuth or a pitch angle of the object in the detection range of the radar; extracting a feature from the gesture data, to obtain gesture feature information; and obtaining a target gesture based on the gesture feature information.

Therefore, in the implementation of this application, the echo data may be filtered in a plurality of dimensions such as the speed, the distance, or the angle, to filter out information, in the echo data, about an object that is in a different range, for example, a different speed, distance, or angle, from a gesture of a user, so as to obtain gesture data including less interference data. In addition, recognition is performed based on the gesture data, to quickly and accurately recognize the gesture, and respond to the gesture of the user. This improves user experience. On the other hand, in this application, the gesture data is obtained by analyzing a radar signal. In comparison with obtaining gesture data in an optical manner, the solution provided in this application is not limited by ambient light intensity, and the gesture data can be obtained in both strong light and dim light scenarios. The solution can be widely applied and requires a small computing amount. In addition, this can further reduce or eliminate a risk of leakage of user privacy data (for example, a user facial image).

In one embodiment, the echo data may include one or more pieces of the following information generated when the object moves in the detection range of the radar: the speed of the object relative to the radar, the distance between the object and the radar, an angle of the object in the detection range of the radar, a position of the object in the detection range, amplitude of movement of the object, a period of the movement of the object, a frequency shift of an echo of the radar relative to a transmit signal, a phase difference of the echo of the radar relative to the transmit signal, or an acceleration of the movement of the object.

Therefore, in the implementation of this application, data included in the detected echo data may include a plurality of parameters indicating that the object moves in the detection range, to facilitate gesture recognition based on the plurality of parameters, and improve accuracy of gesture recognition.

In one embodiment, the target gesture includes a micro-gesture, and the micro-gesture is a gesture formed based on finger movement of a hand. Therefore, in the implementation of this application, even a subtle action of the finger of the user can be recognized. This implements accurate recognition of the micro-gesture of the user, and improve user experience.

In one embodiment, the object includes the finger of the hand. Correspondingly, the echo data includes one or more of the following: a movement speed of the finger, a relative distance between the finger and the radar, an angle of the finger in the detection range, a position of the finger in the detection range, amplitude of movement of the finger, a period of the movement of the finger, an acceleration of the movement of the finger, a frequency shift of the echo of the radar relative to the transmit signal, or the phase difference of the echo of the radar relative to the transmit signal.

Therefore, in the implementation of this application, the radar, for example, a millimeter-wave radar, may be used to detect a parameter generated when the finger of the user moves, to recognize, based on echo data including the parameter generated when the finger of the user moves, gesture formed by the movement of the finger of the user. This implements accurate recognition of the micro-gesture of the user, and improves user experience.

In one embodiment, the preset condition includes one or more of the following: the speed is in a first preset range, the distance is in a second preset range, or the angle is in a third preset range.

In the implementation of this application, the echo data may be filtered in a dimension such as a speed, a distance, or an angle, to increase a proportion of gesture-related data in the gesture data, reduce interference caused by a background or another moving or static object on gesture recognition, and improve accuracy of gesture recognition.

In one embodiment, the filtering out, from the echo data, information that does not meet a preset condition, to obtain gesture data may include: filtering out, by using at least a third-order feedback filter from the echo data, information about an object whose speed is not in the first preset range.

Therefore, in the implementation of this application, a higher-order feedback filter may be used to filter the echo data, so that performance of filtering some low-speed or static objects is better, and more interference data can be filtered out. This can improve accuracy of subsequent gesture recognition.

In one embodiment, before the extracting a feature from the gesture data, to obtain gesture feature information, the method may further include: capturing, from the gesture data, data between start gesture data and end gesture data, to obtain updated gesture data.

Therefore, in the implementation of this application, to reduce data redundancy and further improve efficiency and accuracy of gesture recognition, information between a start gesture and an end gesture may be captured from the gesture data, to quickly and accurately recognize the gesture subsequently.

In one embodiment, before the capturing, from the gesture data, information between a start gesture and an end gesture, the method may further include: The start gesture data includes data in which a variance of a signal in the gesture data is greater than a first preset value, and the end gesture data includes data in which a variance of at least three continuous frames in the gesture data is less than a second preset value.

Therefore, in the implementation of this application, when it is detected that a variance of a signal in the echo data is greater than a specific value, the signal may be used as a start point of the gesture. When it is detected that a variance of one frame or a plurality of continuous frames is less than a specific value, an end point of the gesture may be determined, to quickly capture a gesture operation performed by the user. In comparison with using a fixed activation gesture, a quick response may be made to a gesture operation of the user in this application. This improves user experience.

In one embodiment, the extracting a feature from the gesture data, to obtain gesture feature information may include: obtaining movement feature information based on the gesture data, where the movement feature information includes information generated when the object moves in the detection range of the radar; and extracting the feature from the movement feature information, to obtain the gesture feature information.

In the implementation of this application, extracting the feature may be divided into two parts. One part is to extract, from the gesture data, information generated when the object moves in the detection range of the radar, and the other part is to use the information generated when the object moves in the detection range of the radar as an input of a feature extraction network, to extract the feature, so as to obtain the gesture feature information. Therefore, in this application, data indicating a movement status of the object may be extracted by using the feature extraction network based on the information generated when the object moves in the detection range of the radar. This can improve accuracy of subsequent gesture recognition.

In one embodiment, the movement feature information includes Doppler information, the Doppler information includes information about Doppler effect generated when the object moves in the detection range of the radar, and the obtaining movement feature information based on the gesture data may include: separately performing fast Fourier transform based on a fast time dimension and performing short-time fast Fourier transform based on a slow time dimension on the gesture data, to obtain a relationship between a speed and time when the object moves in the detection range; and obtaining the Doppler information based on the relationship between the speed and the time when the object moves in the detection range.

Therefore, in the implementation of this application, fast Fourier transform based on a fast time dimension and short-time fast Fourier transform based on a slow time dimension may be performed on the gesture data, to obtain the relationship between the speed and the time when the object moves in the detection range. In comparison with performing only fast Fourier transform, to better feed back a movement change status of the object, and accurately recognize the gesture subsequently.

In one embodiment, the movement feature information further includes distance information and angle information, the distance information includes the distance between the object and the radar, the angle information includes the azimuth and the pitch angle of the object in the detection range of the radar. The extracting the feature from the movement feature information of the object, to obtain the gesture feature information includes: fusing at least two of the Doppler information, the distance information, and the angle information, to obtain a multi-channel feature image, where the Doppler information, the distance information, and the angle information separately correspond to one channel; and extracting a feature from the multi-channel feature image by using a feature extraction network, to obtain the gesture feature information.

Therefore, in the implementation of this application, fusion is performed in a plurality of dimensions, for example, the Doppler information, the distance information, and the angle information, to obtain the multi-channel feature image. Therefore, the feature image may be used as an input of the feature extraction network, to extract the feature indicating the change status of the object, so as to accurately recognize the gesture subsequently.

In one embodiment, the obtaining a target gesture by recognizing the gesture feature information may include: obtaining a correlation between a plurality of channels based on the multi-channel feature image; obtaining a self-attention spectrum based on the correlation between the plurality of channels, where the self-attention spectrum indicates a similarity between features in the feature image; fusing the gesture feature information and the self-attention spectrum, to obtain a fusion feature; and recognizing the fusion feature, to obtain the target gesture.

Therefore, in the implementation of this application, the fusion feature may be obtained by using a self-attention mechanism based on the gesture feature information and the correlation between the plurality of channels, to accurately recognize the gesture subsequently.

In one embodiment, the method may further include: sending information about the target gesture to a terminal, where the information about the target gesture is used to control the terminal.

Therefore, in the implementation of this application, after the target gesture is recognized, the target gesture may be sent to the terminal, to control the terminal by using the target gesture.

In one embodiment, the sending information about the target gesture to a terminal may include: obtaining at least one interference gesture; and if a similarity between the target gesture and the at least one interference gesture is not greater than a preset similarity, sending the information about the target gesture to the terminal.

Therefore, in the implementation of this application, the interference gesture may be input in advance. Then, after the gesture is recognized, the gesture is compared with the interference gesture. If the similarity between the target gesture and the at least one interference gesture is not greater than the preset similarity, the information about the target gesture may be sent to the terminal. If the similarity between the target gesture and any interference gesture is greater than the preset similarity, no response may be made to the target gesture or the target gesture may be ignored, to avoid misrecognition.

In one embodiment, the sending information about the target gesture to a terminal includes: if a confidence corresponding to the target gesture is greater than a preset confidence, sending the information about the target gesture to the terminal.

Therefore, in this implementation of this application, if the confidence of the recognized target gesture is greater than the preset confidence, the information about the target gesture may be sent to the terminal. When the confidence of the recognized target gesture is less than the preset value, it may be understood that no gesture is recognized. Then, no response may be made to the target gesture, to avoid misrecognition.

In one embodiment, whether to respond to the target gesture may further be determined based on the confidence of the target gesture and the similarity between the target gesture and the interference gesture. Specifically, if the similarity between the target gesture and the at least one interference gesture is not greater than the preset similarity, and the confidence is greater than the preset value, the information about the target gesture is sent to the terminal. If the similarity between the target gesture and any interference gesture is greater than the preset similarity, or if the confidence corresponding to the target gesture is greater than the preset confidence, the information about the target gesture is not sent to the terminal, that is, no response is made to the target gesture, to avoid misrecognition or a misoperation of the movement of the hand of the user.

In one embodiment, the terminal is used in a vehicle. The radar is disposed on a steering column under a steering wheel of the vehicle, the radar is disposed in front of a driver seat, the radar is disposed in front of a passenger seat, the radar is disposed between a driver seat and a passenger seat, or the radar is disposed behind a driver seat or a passenger seat. The target gesture is used to control the vehicle.

Therefore, in the implementation of this application, the radar may be disposed at a position, in the vehicle, that is not affected by a driving operation of the driver, so that the driver can safely perform a gesture operation during driving, and conveniently perform a gesture operation to set the vehicle. This improves user experience.

According to a second aspect, this application provides a gesture recognition apparatus, including:

a transceiver unit, configured to obtain echo data of a radar, where the echo data includes information generated when an object moves in a detection range of the radar;

a filtering unit, configured to filter out, from the echo data, information that does not meet a preset condition, to obtain gesture data, where the preset condition includes a condition corresponding to at least two of a distance, a speed, or an angle, the distance includes a distance between the object and the radar, the speed includes a speed of the object relative to the radar, and the angle includes an azimuth or a pitch angle of the object in the detection range of the radar;

a feature extraction unit, configured to extract a feature from the gesture data, to obtain gesture feature information; and a recognition unit, configured to obtain a target gesture based on the gesture feature information.

For effect of any one of the second aspect and the optional implementations of the second aspect, refer to the descriptions of any one of the first aspect and the optional implementations of the first aspect. Details are not described herein again.

In one embodiment, the echo data may include one or more pieces of the following information generated when the object moves in the detection range of the radar: the speed of the object relative to the radar, the distance between the object and the radar, an angle of the object in the detection range of the radar, a position of the object in the detection range, amplitude of movement of the object, a period of the movement of the object, a frequency shift of an echo of the radar relative to a transmit signal, a phase difference of the echo of the radar relative to the transmit signal, or an acceleration of the movement of the object.

In one embodiment, the preset condition includes one or more of the following: the speed is in a first preset range, the distance is in a second preset range, or the angle is in a third preset range.

In one embodiment, the filtering unit is configured to filter out, by using at least a third-order feedback filter from the echo data, information about an object whose speed is not in the first preset range.

In one embodiment, the target gesture includes a micro-gesture, and the micro-gesture is a gesture formed based on finger movement of a hand. Therefore, in the implementation of this application, even a subtle action of the finger of the user can be recognized. This implements accurate recognition of the micro-gesture of the user, and improve user experience.

In one embodiment, the object includes the finger of the hand. Correspondingly, the echo data includes one or more of the following: a movement speed of the finger, a relative distance between the finger and the radar, an angle of the finger in the detection range, a position of the finger in the detection range, amplitude of movement of the finger, a period of the movement of the finger, an acceleration of the movement of the finger, a frequency shift of the echo of the radar relative to the transmit signal, or the phase difference of the echo of the radar relative to the transmit signal.

In one embodiment, the apparatus further includes a gesture detection unit, configured to: before the feature extraction unit extracts the feature from the gesture data, to obtain the gesture feature information, capture, from the gesture data, data between start gesture data and end gesture data, to obtain updated gesture data.

In one embodiment, the start gesture data includes data in which a variance of a signal in the gesture data is greater than a first preset value, and the end gesture data includes data in which a variance of at least three continuous frames in the gesture data is less than a second preset value.

In one embodiment, the feature extraction unit is specifically configured to: obtain movement feature information based on the gesture data, where the movement feature information includes information generated when the object moves in the detection range of the radar; and extract the feature from the movement feature information, to obtain the gesture feature information.

In one embodiment, the movement feature information includes Doppler information, the Doppler information includes information about Doppler effect generated when the object moves in the detection range of the radar, and when obtaining the movement feature information based on the gesture data, the feature extraction unit is specifically configured to: separately perform fast Fourier transform based on a fast time dimension and perform short-time fast Fourier transform based on a slow time dimension on the gesture data, to obtain a relationship between a speed and time when the object moves in the detection range; and obtain the Doppler information based on the relationship between the speed and the time when the object moves in the detection range.

In one embodiment, the movement feature information further includes distance information and angle information, the distance information includes the distance between the object and the radar, the angle information includes the azimuth and the pitch angle of the object in the detection range of the radar. The feature extraction unit is specifically configured to: fuse at least two of the Doppler information, the distance information, and the angle information, to obtain a multi-channel feature image, where the Doppler information, the distance information, and the angle information separately correspond to one channel; and extract a feature from the multi-channel feature image by using a feature extraction network, to obtain the gesture feature information.

In one embodiment, the recognition unit is specifically configured to: obtain a correlation between a plurality of channels based on the multi-channel feature image; obtain a self-attention spectrum based on the correlation between the plurality of channels, where the self-attention spectrum indicates a similarity between features in the feature image; fuse the gesture feature information and the self-attention spectrum, to obtain a fusion feature; and recognize the fusion feature, to obtain the target gesture.

In one embodiment, the transceiver unit is further configured to send information about the target gesture to a terminal, where the information about the target gesture is used to control the terminal.

In one embodiment, the transceiver unit is further configured to obtain at least one interference gesture; and if a similarity between the target gesture and the at least one interference gesture is not greater than a preset similarity, send the information about the target gesture to the terminal.

In one embodiment, the transceiver unit is further configured to: if a confidence corresponding to the target gesture is greater than a preset confidence, send the information about the target gesture to the terminal.

In one embodiment, the transceiver unit is specifically configured to: when a similarity between the target gesture and at least one interference gesture is not greater than a preset similarity and a confidence corresponding to the target gesture is greater than a preset confidence, send the information about the target gesture to the terminal.

In one embodiment, the terminal is used in a vehicle. The radar is disposed on a steering column under a steering wheel of the vehicle, the radar is disposed in front of a driver seat, the radar is disposed in front of a passenger seat, the radar is disposed between a driver seat and a passenger seat, or the radar is disposed behind a driver seat or a passenger seat. The target gesture is used to control the vehicle, and the target gesture is used to control the vehicle.

According to a third aspect, an embodiment of this application provides a gesture recognition apparatus. The gesture recognition apparatus has a function of implementing the gesture recognition method in the first aspect. The function may be implemented by hardware, or may be implemented by hardware by executing corresponding software. The hardware or the software includes one or more modules corresponding to the function.

According to a fourth aspect, an embodiment of this application provides a gesture recognition apparatus, including a processor and a memory. The processor and the memory are interconnected through a line, and the processor invokes program code in the memory to perform a processing-related function in the gesture recognition method in any implementation of the first aspect. In one embodiment, the gesture recognition apparatus may be a chip.

According to a fifth aspect, an embodiment of this application provides a gesture recognition apparatus. The gesture recognition apparatus may also be referred to as a digital processing chip or a chip. The chip includes a processing unit and a communication interface. The processing unit obtains program instructions through the communication interface, and when the program instructions are executed by the processing unit, the processing unit is configured to perform a processing-related function in any one of the first aspect or the optional implementations of the first aspect.

According to a sixth aspect, an embodiment of this application provides a computer-readable storage medium including instructions. When the instructions are run on a computer, the computer is enabled to perform the method in any one of the first aspect or the optional implementations of the first aspect.

According to a seventh aspect, an embodiment of this application provides a computer program product including instructions. When the computer program product is run on a computer, the computer is enabled to perform the method in any one of the first aspect or the optional implementations of the first aspect.

According to an eighth aspect, this application provides a vehicle. The vehicle includes a radar and a processor, and the radar is connected to the processor. The processor may be configured to perform the method in any one of the first aspect or the optional implementations of the first aspect. The radar is configured to collect echo data.

In one embodiment, the radar is disposed on a steering column under a steering wheel of the vehicle, the radar is disposed in front of a driver seat, the radar is disposed in front of a passenger seat, the radar is disposed between a driver seat and a passenger seat, or the radar is disposed behind a driver seat or a passenger seat. The target gesture is used to control the vehicle.

According to a ninth aspect, this application provides a terminal. The terminal includes a radar and a processor, and the radar is connected to the processor. The processor may be configured to perform the method in any one of the first aspect or the optional implementations of the first aspect. The radar is configured to collect echo data.

DESCRIPTION OF EMBODIMENTS

The following describes technical solutions in embodiments of this application with reference to the accompanying drawings in embodiments of this application. It is clear that the described embodiments are merely a part rather than all of embodiments of this application. All other embodiments obtained by a person of ordinary skill in the art based on embodiments of this application without creative efforts shall fall within the protection scope of this application.

Figure 1:
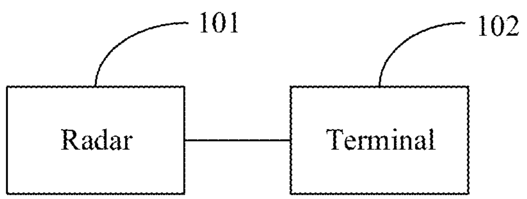
FIG. 1 is a schematic diagram of a system architecture according to this application.

Described here is an architecture to which a gesture recognition method provided in this application is applied. The gesture recognition method provided in this application may be applied to various devices with a radar or devices connected to a radar. For example, the architecture to which the gesture recognition method provided in this application is applied may be shown in FIG. 1. The system architecture may include a radar 101 and a terminal 102. The radar 101 may be disposed in the terminal 102, or may establish a wired or wireless connection to the terminal 102.

The terminal provided in this application is first described. The terminal may include a smart mobile phone, a television, a tablet computer, a band, a head-mounted display (HMD), an augmented reality (AR) device, a mixed reality (MR) device, a cellular phone, a smartphone, a personal digital assistant (PDA), a tablet computer, a vehicle-mounted electronic device, a laptop computer, a personal computer (PC), a monitoring device, a robot, a vehicle-mounted terminal, a wearable device, a self-driving vehicle, or the like. It is clear that a specific form of the terminal is not limited in the following embodiments.

The radar 101 mentioned in this application may be specifically a laser radar or a millimeter-wave radar with an electromagnetic wave above 24 GHz, and an antenna of the radar may be a multiple-input multiple-output antenna or a single antenna. In the following implementations of this application, a millimeter-wave radar is used as an example for description. The millimeter-wave radar mentioned below in this application may alternatively be replaced with a laser radar. For example, the radar may be a millimeter-wave radar with an operating frequency of 60 GHz, for example, a frequency modulated continuous wave (FMCW) radar or a single frequency continuous wave radar.

Figure 2:
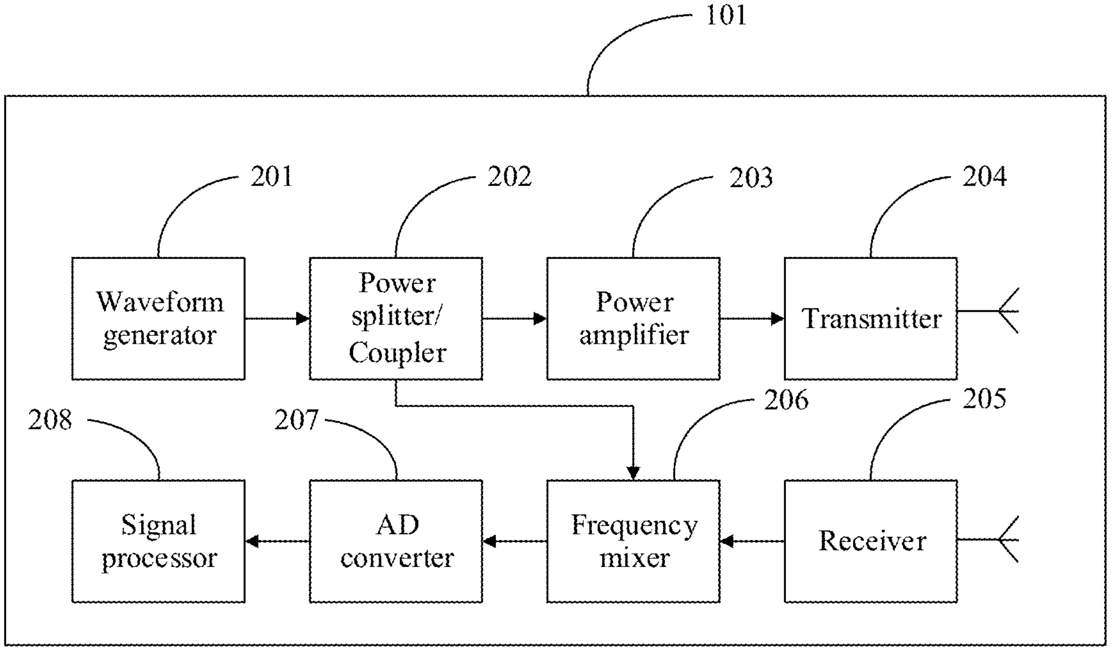
FIG. 2 is a schematic diagram of a structure of a radar according to this application.

For example, a structure of the radar 101 may be shown in FIG. 2. The radar may specifically include modules, for example, a transmitter 204, a receiver 205, a power amplifier 203, a power splitter/coupler 202, a frequency mixer 206, a waveform generator 201, an analog-to-digital converter (AD) 207, and a signal processor 208.

The waveform generator 201 generates a frequency-modulated signal. The frequency-modulated signal is split into two signals by using the power splitter/coupler 202. After one signal is amplified by using the power amplifier 203, a transmit signal is generated by using the transmitter 204, and is radiated by using a transmit antenna. The other signal is used as a local oscillator signal, and is mixed, by using the frequency mixer 206, with an echo signal received by the receiver 205 through a receive antenna, to generate an intermediate frequency signal. Then, the AD converter 207 converts the signal into a digital signal. A main objective of the signal processor 208 is to extract frequency information from the intermediate frequency signal, and obtain target basic information such as a distance and a speed through further processing, for subsequent gesture recognition.

Specifically, the transmitter of the radar may continuously transmit modulated signals; and the modulated signal is reflected by a target object, and then received by the receiver of the radar. When a gesture is made, information such as a distance and an angle (an azimuth, a pitch angle, or the like) in/at which a radar signal carries the gesture, Doppler information, and micro-Doppler information is obtained, to form data of the current gesture, and then subsequent processing is performed.

For example, the millimeter-wave radar uses an FMCW radar. The radar has a plurality of advantages. For example, the radar enjoys simple hardware processing, has a simple structure, a small size, a small weight, and low costs, and is easy to implement and suitable for data obtaining and digital signal processing. Theoretically, the FMCW radar has no ranging blind area, and average power of a transmitted signal is equal to peak power. Therefore, using a small-power device can reduce a probability of that the signal is intercepted and interfered.

In the gesture recognition method provided in this application, when a user makes a gesture, the radar receives an echo signal, and then processes the echo signal, to extract a feature that indicates a change of the gesture. Further, the gesture of the user is recognized based on the feature. The gesture recognition method provided in this application may be performed by a processor. The processor may be a processor in the terminal, or may be a processor disposed on a same PCB board as the radar. For example, the processor, for example, the signal processor 208, may be disposed in a chip of the radar. The processor may be configured to perform the gesture recognition method provided in this application. After a target gesture is recognized, the target gesture is sent to the terminal, to control the terminal. Alternatively, the method provided in this application may be performed by the processor disposed in the terminal. In other words, after the radar obtains echo data, the radar converts the echo data into a digital signal by using the AD converter, and sends the digital signal to the terminal. The terminal performs gesture recognition based on the echo data, so that the user can directly control the terminal by using the gesture.

The gesture recognition method provided in this application may be applied to each scenario in which gesture recognition needs to be performed. In view of this, this application provides a plurality of terminals, a vehicle in which a terminal is used, and the like. The following is described by using some specific scenarios as examples.

Scenario 1: Apply to a Mobile Terminal

Figure 3:
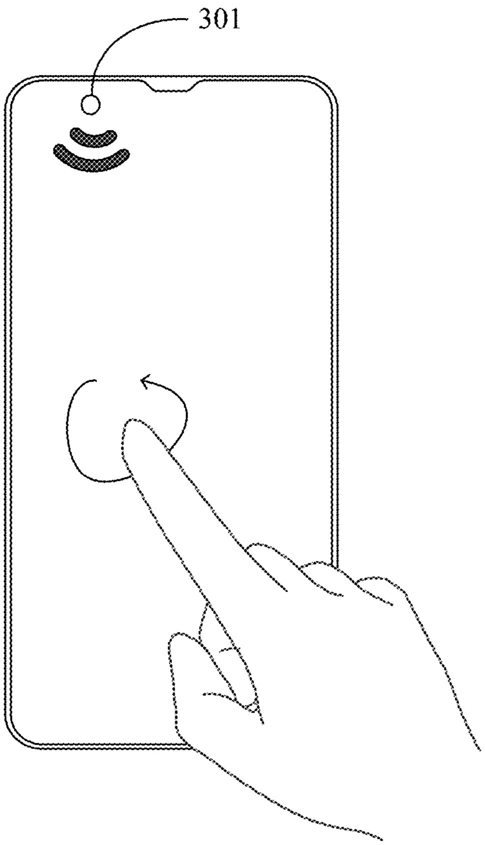
FIG. 3 is a schematic diagram of a structure of a terminal according to this application.

As shown in FIG. 3, a radar 301 may be disposed in the terminal, and may be disposed on a same surface as a display of the terminal, for example, disposed on a top-left corner, a top-right corner, a bottom-left corner, a bottom-right corner, or a frame of the display, or may even be disposed on a back surface of the terminal. The radar may send a modulated wave to the front of the terminal, and the user may perform a gesture operation facing the display of the terminal. The modulated wave sent by the radar is reflected by a gesture of the user. After a receiver of the radar receives an echo signal, subsequent gesture recognition can be performed based on the echo signal. Therefore, the user can control the terminal by using the gesture, for example, control a function such as screenshot, playing music, playing a video, or sliding down. This improves user experience.

Alternatively, the terminal may establish a connection with the radar, and the radar may be disposed outside the terminal. For example, in the vehicle, the terminal may be disposed in a back seat, or the radar may be disposed in a driver cabin, so that a driver may control the terminal in the back seat during driving. The user may perform a gesture operation within a detection range of the radar, and then the radar sends an echo signal to the terminal. After recognizing a gesture, the terminal responds to the gesture. Alternatively, after a processor disposed on a same PCB board as the radar recognizes a gesture, the recognized gesture is sent to the terminal, so that the terminal responds to the gesture.

Scenario 2: Apply to a Vehicle

This application further provides a vehicle. The vehicle includes a processor and a radar. The processor may be configured to perform operations of the gesture recognition method provided in this application. A radiation direction of the radar may be set to a direction that is not interfered by a driving operation of a driver, and the radar is configured to collect echo data. The following uses an example to describe a manner of setting the radar.

The radar may be disposed at a plurality of positions of the vehicle, or one or more radars may be disposed in the vehicle. The user may control all or some devices in the vehicle by performing a gesture operation in the vehicle, for example, controlling a window to roll up or down, controlling an air conditioner to turn on or off, controlling a seat to move forward or backward, and controlling to play a video or audio. Usually, to facilitate control of the driver, minimize other interference, and eliminate distractions that attract attention of the driver in the vehicle, two positions to dispose the millimeter-wave radar are proposed: one is behind a steering wheel, and the other is near a central control system, for gesture recognition in a cabin.

Figure 4:
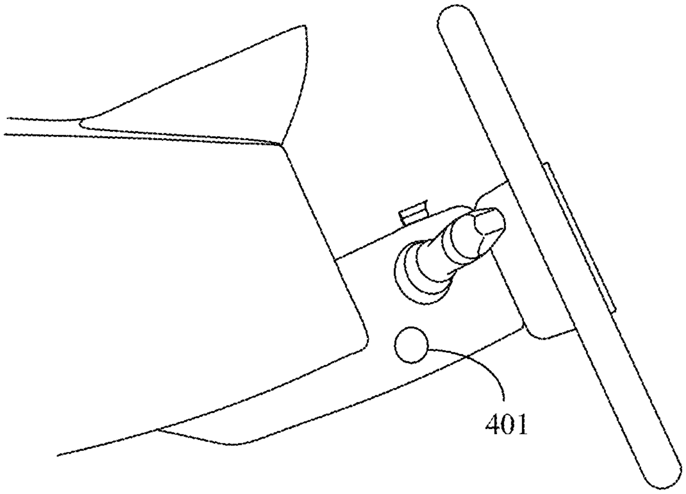
FIG. 4 is a schematic diagram of a structure of a vehicle according to this application.

In a possible scenario, the radar may be disposed near a steering wheel, for example, disposed on a steering column under the steering wheel, for example, the radar 401 shown in FIG. 4. A signal transmission direction of the radar 401 may be deviated from a vertical direction and towards a direction of a passenger seat, in other words, the vertical direction is from a driver seat to the steering wheel. For example, during driving, if the driver needs to operate some devices in the vehicle, the driver may perform a gesture operation on a right side of the steering wheel, so that the driver can quickly and conveniently perform the gesture operation. The gesture can be accurately recognized, and driving safety of the user can be improved. Therefore, when operating the vehicle, the user may perform a gesture operation in a direction in which the steering wheel deviates from the passenger seat, to control the vehicle by using the gesture operation. This can avoid interference caused by a normal driving operation of the user to gesture recognition, improve accuracy of gesture recognition, and improve user experience.

Figure 5:
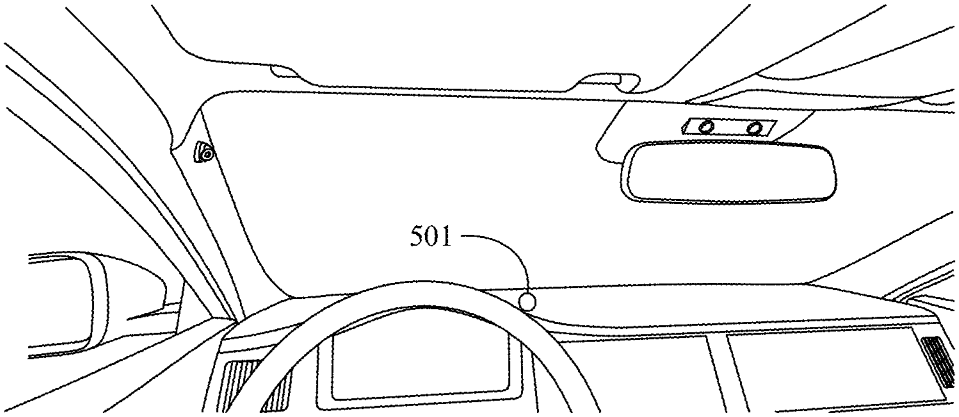
FIG. 5 is a schematic diagram of a structure of another vehicle according to this application.

In a possible scenario, the radar may be disposed in front of the driver seat. As shown in FIG. 5, a radar 501 may be disposed near a dashboard in front of the driver seat. A transmission direction of the radar 501 may be a direction towards the driver, so that the driver can perform an operation on a device in the vehicle by using a gesture. This can avoid interference caused by a driving operation to gesture recognition. For example, when driving the vehicle, the user only needs to perform a gesture operation on a top-right corner of the steering wheel, to control a device in the vehicle, and improve user experience.

Figure 6:
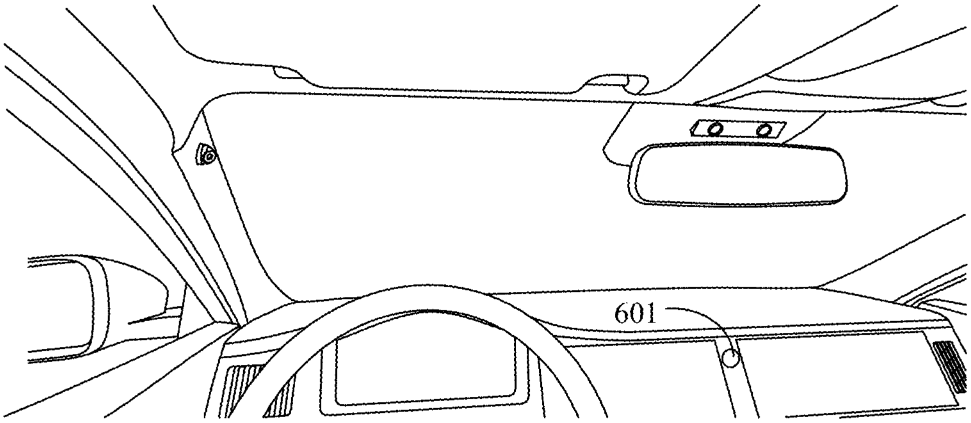
FIG. 6 is a schematic diagram of a structure of another vehicle according to this application.

In a possible scenario, the radar may be disposed near a central console of the vehicle, namely, an area between the driver seat and the passenger seat in the vehicle. As shown in FIG. 6, a radar 601 may be disposed near the central console of the vehicle, and a signal transmission direction of the radar is towards the driver seat. For example, when sitting on the driver seat or the passenger seat in the vehicle, the user may perform a gesture operation, for example, waving or pressing, in a direction of the central console, to control a device in the vehicle.

Figure 7A:
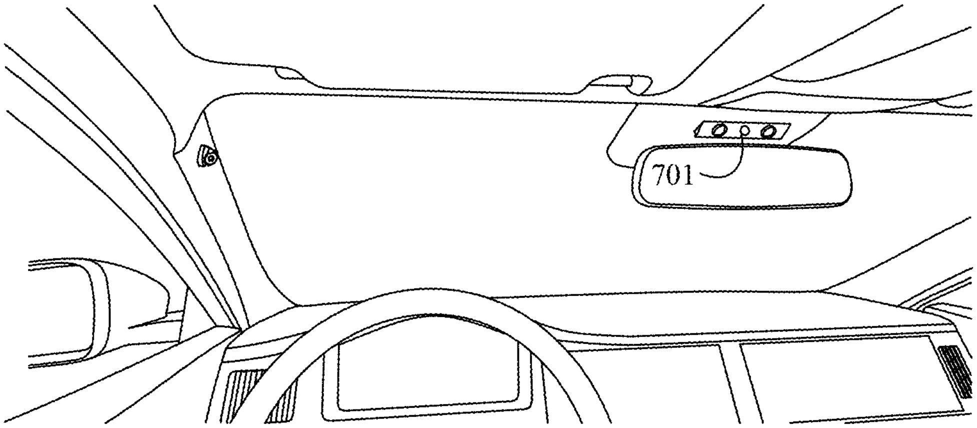
FIG. 7A is a schematic diagram of a structure of another vehicle according to this application.
Figure 7B:
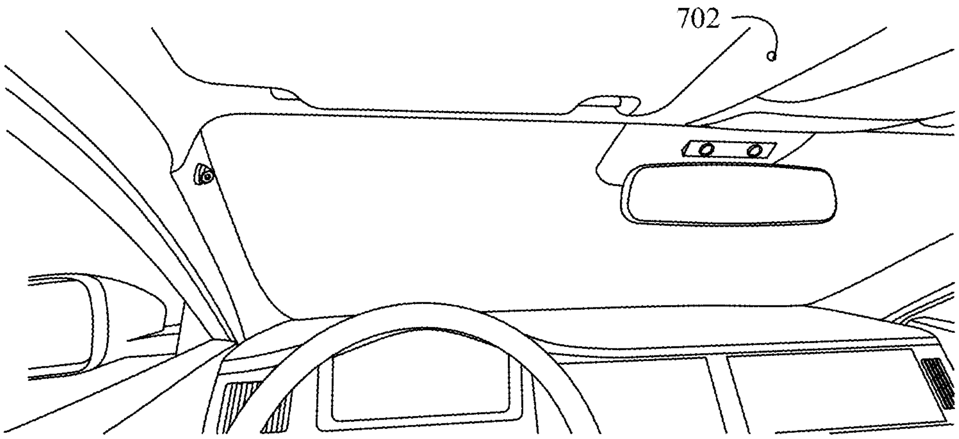
FIG. 7B is a schematic diagram of a structure of another vehicle according to this application.

In other possible scenarios, the radar may alternatively be disposed at another position of the driver cabin. As shown in FIG. 7A, a radar 701 may alternatively be disposed near an in-vehicle rearview mirror, and a transmission direction of the radar is also towards the driver seat. Alternatively, a radar 702 shown in FIG. 7B may alternatively be disposed above the passenger seat in the vehicle. In addition, the radar may alternatively be disposed on a cup holder between the driver seat and the passenger seat, and a signal transmission direction is towards the driver seat.

Figure 8:
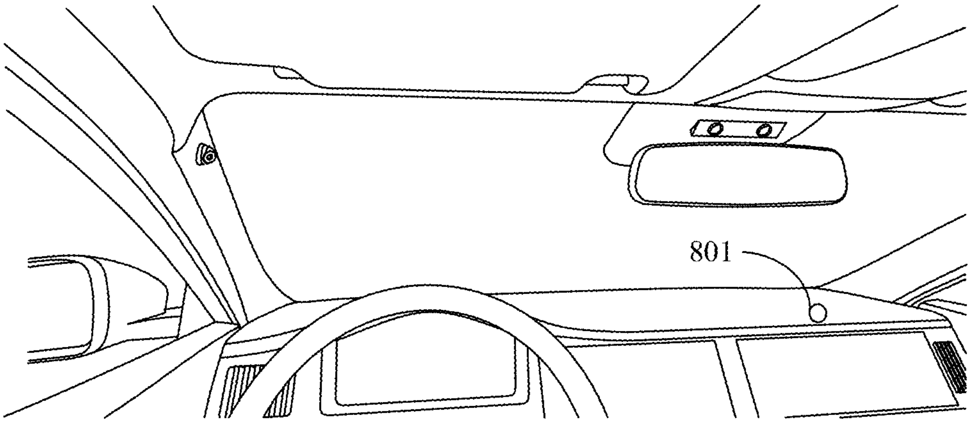
FIG. 8 is a schematic diagram of a structure of another vehicle according to this application.

Certainly, a radar may alternatively be disposed in front of the passenger seat, so that a user sifting on the passenger seat may also control an apparatus in the vehicle by using a gesture. For example, a radar 801 disposed in front of the passenger seat shown in FIG. 8 is used by the user sitting on the passenger seat to control a device in the vehicle by using a gesture, for example, controlling a window to roll up or down, controlling the air conditioner to turn on or off, controlling a seat to move forward or backward, and controlling to play a video or audio. This can improve experience of the user on the passenger seat.

Figure 9A:
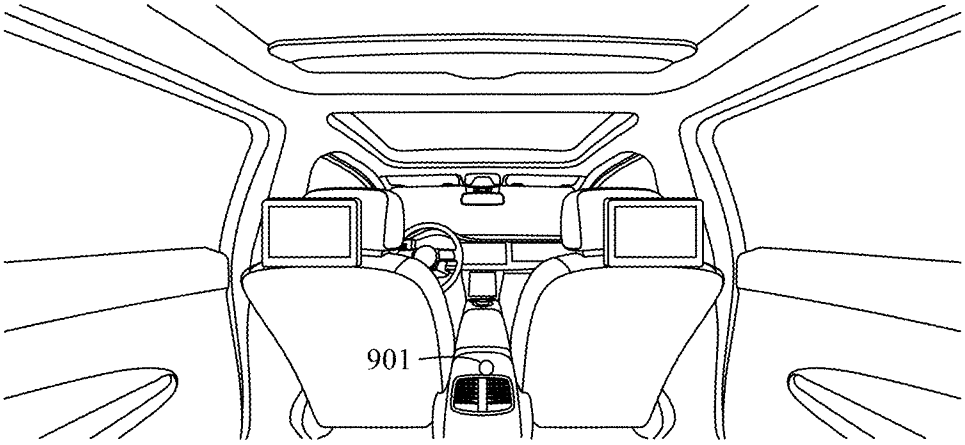
FIG. 9A is a schematic diagram of a structure of another vehicle according to this application.
Figure 9B:
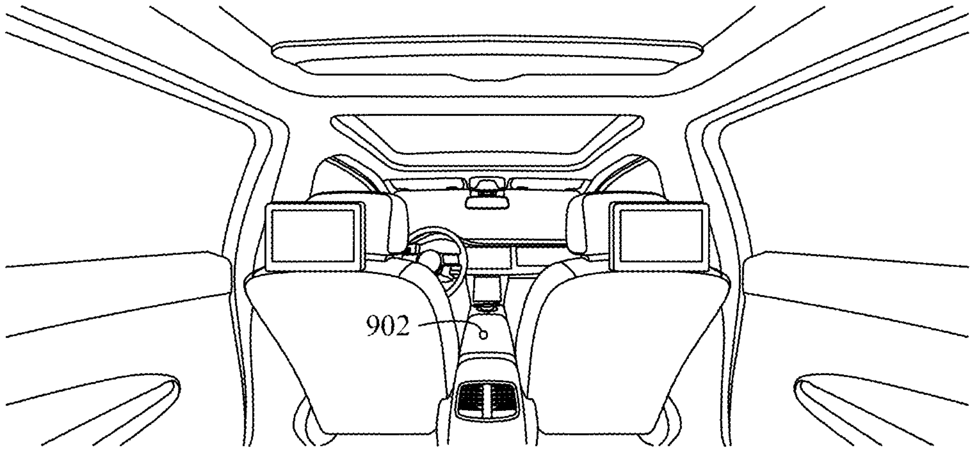
FIG. 9B is a schematic diagram of a structure of another vehicle according to this application.

In addition, a radar may alternatively be disposed on a back seat of the vehicle for gesture recognition. For example, as shown in FIG. 9A, a radar 901 may be disposed between the passenger seat and the driver seat. Alternatively, a radiation direction of a radar 902 shown in FIG. 9B faces a back seat, so that a user sifting on the back seat can control a device in the vehicle by using a gesture, for example, controlling a window to roll up or down, controlling the air conditioner to turn on or off, controlling a seat to move forward or backward, and controlling to play a video or audio. This can improve experience of a user on a back seat.

Figure 9C:
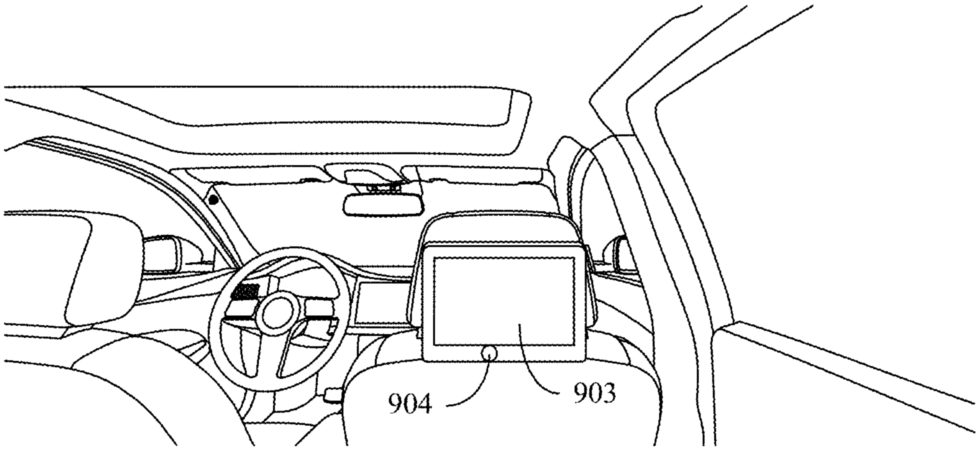
FIG. 9C is a schematic diagram of a structure of another vehicle according to this application.

For another example, as shown in FIG. 9C, a display 903 may be disposed on a back seat of the vehicle for entertainment of a user sifting on the back seat, and a radar, for example, a radar 904 shown in FIG. 9C, may be disposed near the display 903. For example, when the user needs to control the display 903, the user may perform a gesture operation towards the radar 904.

Scenario 3: Apply to a Wearable Device

Figure 10:
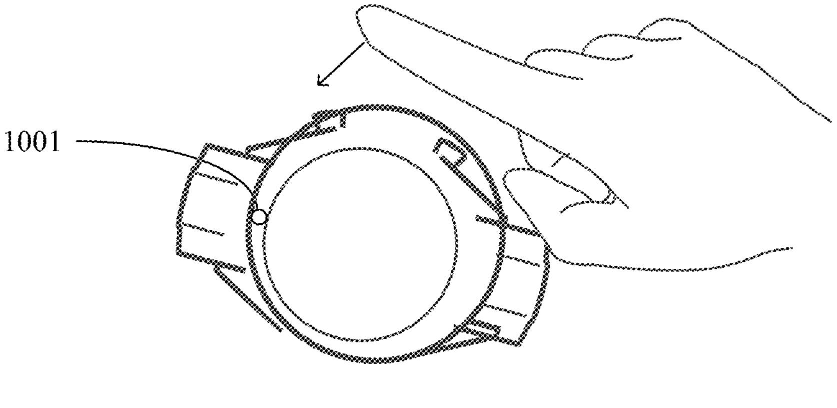
FIG. 10 is a schematic diagram of a structure of another terminal according to this application.

For example, as shown in FIG. 10, a radar 1001 may be disposed around a watch face of a smartwatch. A signal transmission direction of the radar 1001 may be a direction perpendicular to the watch face. A user may control the smartwatch by performing a gesture operation above the watch face, for example, reading a message, and displaying time. This can improve user experience.

Therefore, in an implementation of this application, a plurality of manners of setting a radar or to set a terminal or a vehicle connected to a radar are provided. The radar is disposed at a position that is less interfered, for example, the radar is disposed at a position that is less affected by a driving operation of a driver. Therefore, this can avoid interference caused by the background when a gesture operation is performed, improve accuracy of gesture recognition, and improve user experience.

With reference to the scenarios, this application further provides a gesture recognition method, to more efficiently and accurately recognize a gesture in various gesture recognition scenarios, and improve user experience.

With reference to the scenarios, the following describes the gesture recognition method provided in this application.

Figure 11:
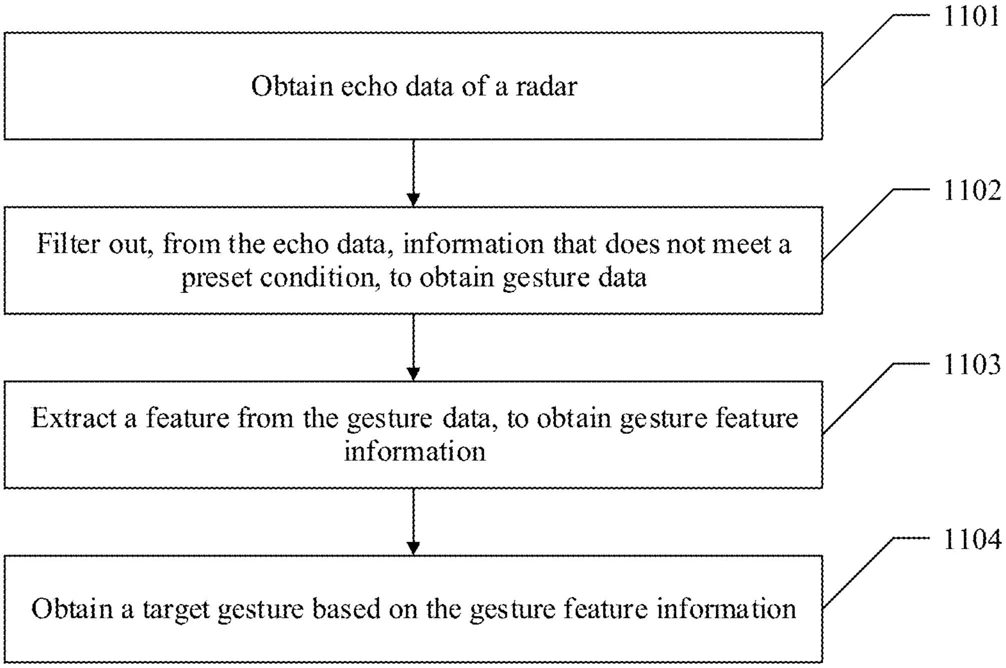
FIG. 11 is a schematic flowchart of a gesture recognition method according to this application.

First, refer to FIG. 11. FIG. 11 is a schematic flowchart of a gesture recognition method according to this application.

1101: Obtain Echo Data of a Radar.

The radar may transmit a modulated wave in a radiation range, and the modulated wave is reflected by an object and then received by the radar, to form an echo signal. The echo data includes one or more detected information, for example, information about a change track that is generated when a hand of the user moves in the radiation range, generated when the object moves in a detection range of the radar.

Specifically, the echo data may include one or more pieces of the following information generated when the object moves in the radiation range of the radar: a speed of the object relative to the radar, a distance and an angle between the object and the radar, amplitude of movement of the object, a period of the movement of the object, a frequency shift of an echo of the radar relative to a transmit signal, a phase of the echo of the radar relative to the transmit signal, or an acceleration of the movement of the object. The angle may include a pitch angle or an azimuth.

For example, the radar may be disposed under a steering wheel, and the radiation range of the radar is a right side of a driver. During driving, if the driver needs to operate some devices in a vehicle, the driver may perform a gesture operation on the right side of the steering wheel. The radar continuously transmits modulated signals, and the modulated signal is reflected by the hand of the user and then received by a receiver of the radar. When the gesture operation is performed, a distance between the radar and a gesture, an azimuth, a pitch angle, Doppler information, micro-Doppler information (namely, information about Doppler effect generated by movement of a small object or a part of an object), and the like that may be carried in the echo signal are captured, to form echo data of the current gesture for subsequent processing.

More specifically, in this application, the gesture formed by movement of the hand of the user may be an overall gesture or a micro-gesture. The overall gesture is a gesture formed by movement of the entire hand of the user, and the micro-gesture is a gesture formed by movement of a finger of the user. Usually, the micro-gesture in this application is a gesture formed by a fine action, for example, an action of pulling a slider or an action of sliding a fixed shape by the finger, of the finger of the user. In other words, the object mentioned in the implementation of this application may include the entire hand or the finger of the user. If the object includes the finger of the user, correspondingly, the echo data may include data of movement of the finger of the user. For example, the echo data may include one or more of the following: a relative distance between the finger and the radar, a speed of the finger relative to the radar, an angle of the finger in the detection range, amplitude of movement of the finger, a period of the movement of the finger, a frequency shift of an echo that is reflected by the finger relative to the transmit signal, a phase difference of the echo that is reflected by the finger relative to the transmit signal, or an acceleration of the movement of the finger. It should be noted that, in the following implementations of this application, if the formed gesture is a micro-gesture, the object mentioned below may be replaced with a part of the hand of the user, for example, a finger or a part of a finger and a palm.

1102: Filter out, from the Echo Data, Information that does not Meet a Preset Condition, to Obtain Gesture Data.

After the echo data of the radar is obtained, the echo data may include other interference information other than gesture information of the user. For example, other than the gesture data, the echo data may further include information about one or more objects in the background. Therefore, the echo data may be filtered, or the gesture data may be selected from the echo data, to reduce interference data in the obtained gesture data, and improve accuracy of gesture recognition.

The preset condition includes a condition corresponding to at least two of a distance, a speed, or an angle, the distance is the distance between the detected object and the radar, the speed is the speed of the object relative to the radar, and the angle is the azimuth or the pitch angle of the object in the detection range of the radar. The azimuth or the pitch angle may be in a coordinate system centered around the radar, or in a coordinate system centered around another position. Therefore, information about an unnecessary object included in the echo data is filtered out in a dimension of a distance, a speed, and/or an angle, to select available gesture data.

Specifically, the preset condition may include one or more of the following: the speed is in a first preset range, the distance is in a second preset range, or the angle (the pitch angle and/or the azimuth) is in a third preset range. In addition, the preset condition may further include but is not limited to one or more of the following: the amplitude is in a fourth preset range, the period is in a fifth preset range, the phase is in a sixth preset range, or the acceleration is in a seventh preset range. For example, the preset condition may include that the distance between the object and the radar is in a range of 20 cm to 40 cm. If a distance between an object and the radar is not in the range, data of the object is filtered out. For example, the data of the object in the echo data is set to 0.

For example, the following uses examples to describe some possible preset conditions.

In one embodiment, information about an object whose speed is not in the first preset range may be filtered out from the echo data, to obtain the gesture data. In other words, information about an object whose speed is in the first preset range may be selected from the echo data, to obtain the gesture data. For example, data of an object whose speed is not in a range of 0.1 m/s to 0.5 m/s may be filtered out from the echo data, to obtain data corresponding to the gesture of the user. It may be understood that, in the implementation, filtering may be performed in a dimension of a speed, to filter out an object that is not in a same speed range as the gesture. This can reduce interference caused by another moving or static object to gesture recognition, and improve accuracy of subsequent gesture recognition.

In one embodiment, information about an object whose distance is not in the second preset range may be filtered out from the echo data, to obtain the gesture data. In other words, information about an object whose distance from the radar is in the second preset range is selected from the echo data, to obtain the gesture data. For example, data of an object whose distance from the radar is beyond 20 cm to 40 cm may be filtered out from the echo data, to obtain the gesture data. It may be understood that data of an object whose position is not in a same distance range as the position of the gesture may be filtered out in a dimension of a distance, to extract data of an object in a same distance range as the gesture. This can reduce interference caused by data of an object in the background to gesture recognition, and improve accuracy of subsequent gesture recognition.

In one embodiment, information about an object whose angle is not in the third preset range may alternatively be filtered out from the echo data, to obtain the gesture data. In other words, information about an object whose azimuth or pitch angle is in the third preset range is selected from the echo data, to obtain the gesture data. For example, the preset condition may include that the pitch angle of the object is in a range of 60° to 150°, or the azimuth is in a range of 50° to 110°, and information about an object whose angle is not in the range is filtered out from the echo data. It may be understood that, data of an object that is not in a same spatial angle range as the hand of the user is filtered out from the echo data. This can reduce interference, to gesture recognition, caused by an object in a different position from the gesture, and improve accuracy of gesture recognition. For example, the radar may be disposed in a central console of a vehicle, a range of a pitch angle between a driver seat and the radar is 30° to 120°, a range of an azimuth is 50° to 110°, a range of a pitch angle between a passenger seat and the radar is 160° to 250°, a range of an azimuth is 140° to 200°. After the echo data of the radar is obtained, data of an object whose pitch angle is beyond 30° to 120° or data of an object whose azimuth is beyond 50° to 110° is filtered out from the echo data. For example, if the echo data includes data of an object whose pitch angle is in the range of 160° to 250° or azimuth angle is in the range of 140° to 200°, the data is generated based on data of an object, in the passenger seat, that is in relative movement relative to the radar. Therefore, to prevent data of the passenger seat from affecting gesture recognition of the driver, data generated by the passenger seat in the echo data may be filtered out. This can improve accuracy of recognizing the gesture of the driver.

In one embodiment, when data is filtered in a dimension of a speed, at least a third-order feedback filter may be used for filtering. To improve a filtering degree of a low-speed object, a higher-order feedback filter may be used for filtering. For example, a fourth-order feedback filter may be used for filtering, to improve filtering effect on an object moving in a slow speed, and obtain gesture data with less interference data. This can improve accuracy of subsequent gesture recognition.

1103: Extract a Feature from the Gesture Data, to Obtain Gesture Feature Information.

After the echo data is filtered to obtain the gesture data, the feature may be extracted from the gesture data, to obtain the gesture feature information for subsequent gesture recognition.

Specifically, a process of extracting the feature from the gesture data may be divided into two parts. One part is to extract a movement feature, for example, information such as the speed of the object relative to the radar, and the distance between the object and the radar, of the object in a physical dimension from the gesture data, where the object may include all or a part of the hand of the user. The other part is to extract the feature by using a neural network, to perform gesture recognition subsequently by using the feature extracted by using the neural network. The following describes the two parts of the process by using an example.

First Part

Movement feature information may be extracted based on the gesture data, where the movement feature information may include information generated when the object moves in the detection range of the radar.

Specifically, the movement feature information may include one or more pieces of the following information generated when the object moves in the detection range of the radar: the speed of the object relative to the radar, the distance between the object and the radar, the angle in the detection range, the amplitude of movement of the object, the period of the movement of the object, the frequency shift of the echo signal of the radar relative to the transmit signal of the radar, the phase of the echo relative to the transmit signal of the radar, or the acceleration of the movement of the object. If the echo data includes information such as the speed, the distance, the angle, the amplitude, the period, the frequency, the phase, or the acceleration, the information may be directly read from the gesture data. If the echo data does not include the information, calculation may be performed based on the echo data, to obtain information such as the speed, the distance, the angle, the azimuth, the amplitude, the period, the frequency, the phase, or the acceleration.

For example, the movement feature information may include Doppler information, namely, information about Doppler effect generated when the object moves relative to the radar in the detection range, for example, information such as a Doppler frequency shift of the object or a local Doppler frequency shift of the object. Then, the process of extracting the movement feature information may include: separately performing fast Fourier transform based on a fast time dimension and performing short-time fast Fourier transform based on a slow time dimension on the gesture data, to obtain a relationship between a speed and time when the object moves in the detection range; and then obtaining the Doppler information based on the relationship between the speed and the time when the object moves in the detection range. A quantity of frames used in each transformation based on the fast time dimension is less than a quantity of frames used in each transformation based on the slow time dimension. For example, usually, each transformation performed based on the fast time dimension may be understood as performing fast Fourier transform on one frame of data, and each transformation performed based on the slow time dimension may be understood as performing short-time fast Fourier transform on a plurality of frames of data.

Usually, if fast Fourier transform is used for both the two transformations, the extracted information is a relationship between the distance and the speed, and cannot effectively indicate a change status of the object. In this application, in the two transformations, fast Fourier transform is performed in a fast time dimension, and short-time fast Fourier transform is performed in a slow time dimension, to extract the relationship between the speed and the time of the object, so as to better indicate a change status of the object when the object moves in the detection range. Therefore, subsequent gesture recognition can be performed based on a more accurate movement change status of the object, to improve accuracy of gesture recognition, and improve user experience.

Second Part

After the movement feature information of the object is obtained, the movement feature information may be used as an input of the feature extraction network, to output the extracted feature.

The feature extraction network may use a deep convolutional neural network (DCNN), recurrent neural networks (RNNS), or the like. The neural network mentioned in this application may include a plurality of types, for example, a deep neural network (DNN), a convolutional neural network (CNN), a recurrent neural network (RNN), a residual network, or another neural network.

For example, the movement feature information includes distance information, angle information, and Doppler information. The distance information, the angle information, and the Doppler information are separately spliced as channels, to obtain a three-channel feature image. It should be understood that if the movement feature information includes more parameters, a more-channel feature image can be obtained through splicing. Then, a multi-channel feature image is used as an input of the feature extraction network, to extract the feature included in the feature image, and obtain the gesture feature information, so as to perform subsequent gesture recognition.

In one embodiment, a feature that can better indicate a gesture change may be extracted with reference to a self-attention mechanism, to improve accuracy of subsequent gesture recognition. Specifically, after the multi-channel image is obtained through fusion, a correlation between a plurality of channels may be calculated. Then, a self-attention spectrum is obtained based on the correlation, where the self-attention spectrum indicates a relationship between each feature in the feature image and a recognized result, and the self-attention spectrum and the feature recognized by the feature extraction network may be fused, to obtain a fusion feature. Subsequently, recognition may be performed based on the fusion feature, to obtain a target gesture. Therefore, in this implementation of this application, a correlation between information in dimensions is further calculated with reference to the self-attention mechanism, to fuse extracted features based on the correlation. Therefore, a feature obtained through fusion based on the correlation between dimensions can more accurately indicate a gesture change, to improve accuracy of subsequent gesture recognition.

1104: Obtain the Target Gesture Based on the Gesture Feature Information.

After the gesture feature information is extracted, gesture recognition may be performed by using a recognition network, to recognize that a gesture corresponding to the echo data is the target gesture.

In one embodiment, if the fusion feature is obtained with reference to the self-attention mechanism, recognition may be performed based on the fusion feature, to recognize the target gesture.

A specific structure of the recognition network may also include a neural network such as a CNN, a DCNN, an RNNS, a DNN, or an RNN. For example, the recognition network may include three convolutional layers, three fully connected layers, and one softmax layer. The gesture feature information is used as an input of the recognition network, to output the recognized result. Before operation 1101, the recognition network and the feature extraction network may be trained by using data including a plurality of gestures, to obtain trained networks, so as to output an accurate recognized result.

Specifically, the gesture that needs to be recognized may include a gesture formed by movement of the entire hand of the user, and may alternatively include a gesture formed by movement of the finger of the user. It may be understood that the recognized target gesture in this application may be the gesture formed by movement of the entire hand of the user, or the gesture formed by movement of the finger of the user.

Figure 12A:
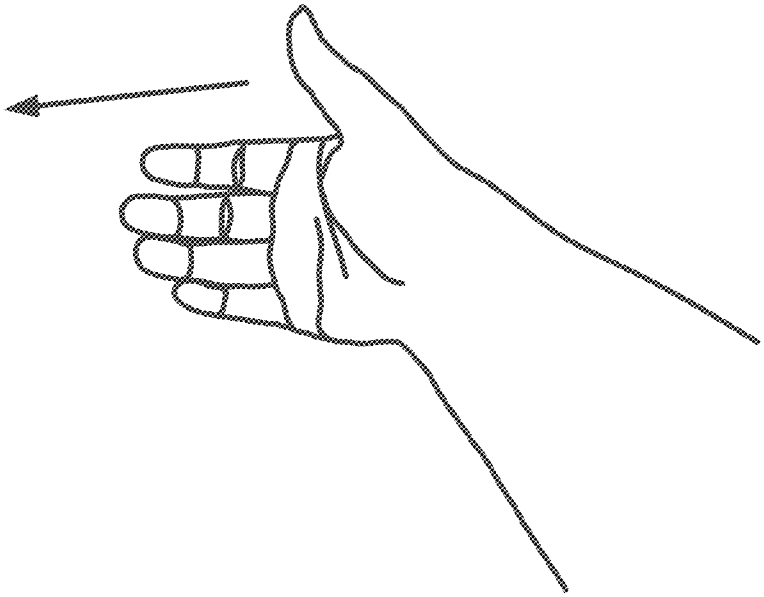
FIG. 12A is a schematic diagram of a gesture according to this application.

For example, for the gesture formed by movement of the entire hand of the user, refer to FIG. 12A. The gesture may be a gesture of swinging the entire hand of the user to the left. For example, during music playing, playing a next song or a previous song is controlled by swinging the hand to the left or the right, or sliding a menu to a previous page or a next page is controlled by swinging the hand to the left or the right.

Figure 12B:
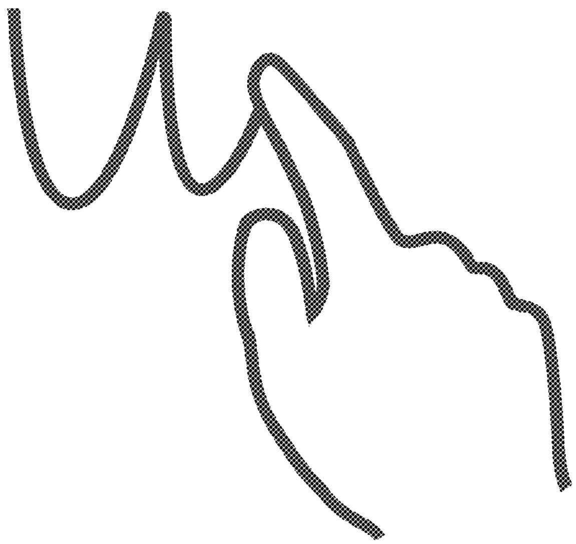
FIG. 12B is a schematic diagram of another gesture according to this application.

For another example, for the gesture formed by movement of the finger of the user, refer to FIG. 12B. The gesture may be a micro-gesture formed by curve movement of an index finger of the user. For example, different shapes may be preset, so that when the index finger slides in different shapes, different functions may be implemented. For example, the index finger moves in an “O” shape to turn on or off the air conditioner in the vehicle, or the index finger moves in a “W” shape to implement voice search.

Figure 12C:
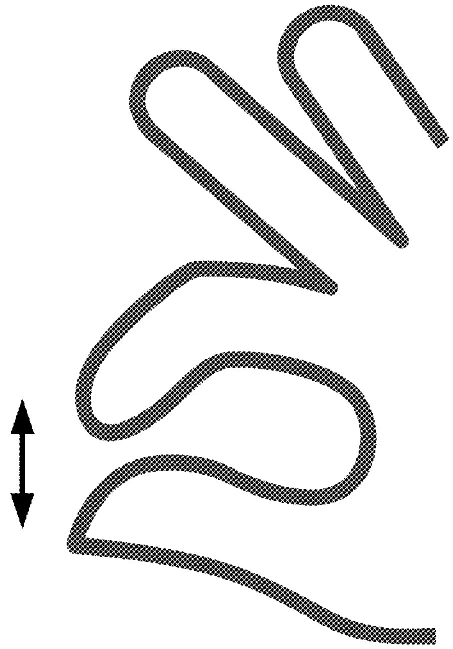
FIG. 12C is a schematic diagram of another gesture according to this application.
Figure 12D:
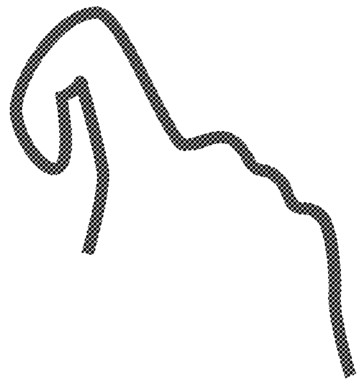
FIG. 12D is a schematic diagram of another gesture according to this application.
Figure 12E:
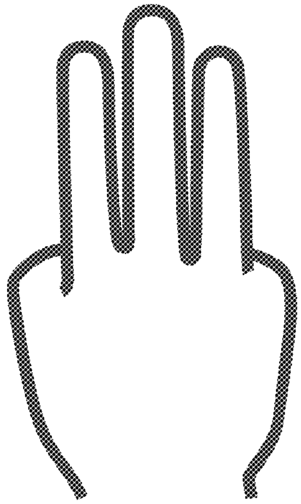
FIG. 12E is a schematic diagram of another gesture according to this application.

For another example, in the gesture shown in FIG. 12C, the gesture may be a micro-gesture formed by relative movement of the index finger and a thumb of the user. For example, zooming of a display page on the display of the vehicle may be controlled by increasing or decreasing a distance between the index finger and the thumb, or increasing or decreasing a temperature of the air conditioner in the vehicle may be adjusted by increasing or decreasing a distance between the index finger and the thumb. Alternatively, the user may implement gesture control by forming the finger of the hand in a specific shape. As shown in FIG. 12D and FIG. 12E, the user controls movement of the finger to form a fixed shape, to control a device in the vehicle.

Therefore, in this implementation of this application, information, in the echo data, about an object that interferes with gesture recognition may be filtered out in a dimension such as a distance or a speed, to prevent subsequent gesture recognition from being interfered by the interference object. This improves accuracy of gesture recognition, and improves user experience.

In one embodiment, after the target gesture is recognized, a recognition result may be sent to the terminal, so that the user can control the terminal by performing a gesture operation. Alternatively, if the gesture recognition method provided in this application is performed by the terminal, the terminal may learn, based on the recognized gesture, that the user needs to perform an operation on the terminal, to respond to the operation of the user. This can improve user experience.

In one embodiment, in one embodiment, before gesture recognition is performed, at least one interference gesture may further be obtained, which may be input by a user or downloaded from a cloud. If a similarity between the target gesture and the at least one interference gesture is not greater than a preset similarity, a response may be made to the target gesture, for example, the target gesture is sent to the terminal. If the similarity between the target gesture and any interference gesture in the at least one interference gesture is greater than the preset similarity, no response may be made to the target gesture, for example, the target gesture is not sent to the terminal, or the target gesture may be ignored.

Therefore, in this implementation of this application, before gesture recognition is performed, the interference gesture may further be input. If the similarity between the recognized gesture and the interference gesture is greater than the preset similarity, no response is made to the gesture, to avoid a misoperation of the user. For example, if the method provided in this application is applied to a vehicle, the user may input some gestures in advance, for example, an action of tapping a button or an action of pulling up a handbrake, that may cause interference to a gesture. Therefore, when the actions are subsequently detected, no response may be made, to reduce a probability of misrecognition. This can improve user experience.

In one embodiment, the interference gesture may alternatively be some gestures that are received from the cloud and that may cause interference to gesture recognition, to skip a process in which the user inputs the interference gesture. This can improve user experience. For example, for a same vehicle model, actions that may cause gesture misrecognition are the same, and interference gestures of the same vehicle model may be searched from the cloud, and applied to the current vehicle. This can improve user experience.

In one embodiment, when a confidence of the recognized gesture is less than a preset confidence, it may be considered by default that recognition fails. In this case, no response may be made to the recognized gesture, for example, the gesture is not sent to the terminal, to avoid a misoperation of the user or misrecognition. This can improve user experience.

In one embodiment, whether to respond to the target gesture may further be determined based on the confidence of the target gesture and the similarity between the target gesture and the interference gesture. Specifically, if the similarity between the target gesture and the at least one interference gesture is not greater than the preset similarity, and the confidence is greater than the preset value, the information about the target gesture is sent to the terminal. If the similarity between the target gesture and any interference gesture is greater than the preset similarity, or if the confidence corresponding to the target gesture is greater than the preset confidence, the information about the target gesture is not sent to the terminal, that is, no response is made to the target gesture, to avoid misrecognition or a misoperation of the movement of the hand of the user. This can improve user experience.

The foregoing describes a procedure of the gesture recognition method provided in this application. The following describes in detail the method provided in this application with reference to a specific application scenario.

Figure 13:
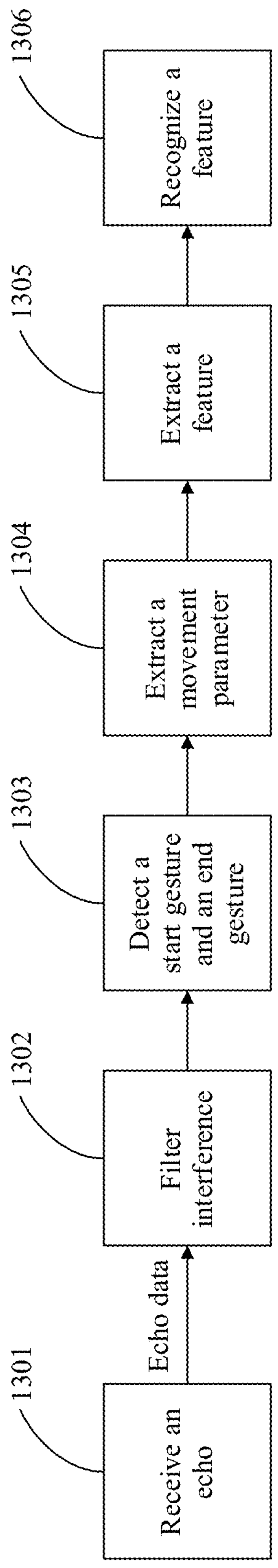
FIG. 13 is a schematic flowchart of another gesture recognition method according to this application.

FIG. 13 is a schematic flowchart of another gesture recognition method according to this application.

1301: Receive an Echo.

First, a radar may transmit a modulated signal to a radiation direction, the modulated signal is reflected by an object and returned to the radar, and the radar receives an echo signal, to obtain echo data.

Information carried in the echo data may include one or more pieces of the following information generated when one or more objects move in a detection range of the radar: a speed of the object relative to the radar, a distance and an angle between the object and the radar, amplitude of movement of the object, a period of the movement of the object, a frequency shift of an echo of the radar relative to a transmit signal, a phase of the echo of the radar relative to the transmit signal, or an acceleration of the movement of the object.

For example, for a specific structure of the radar, refer to FIG. 2. Details are not described herein again.

Figure 14:
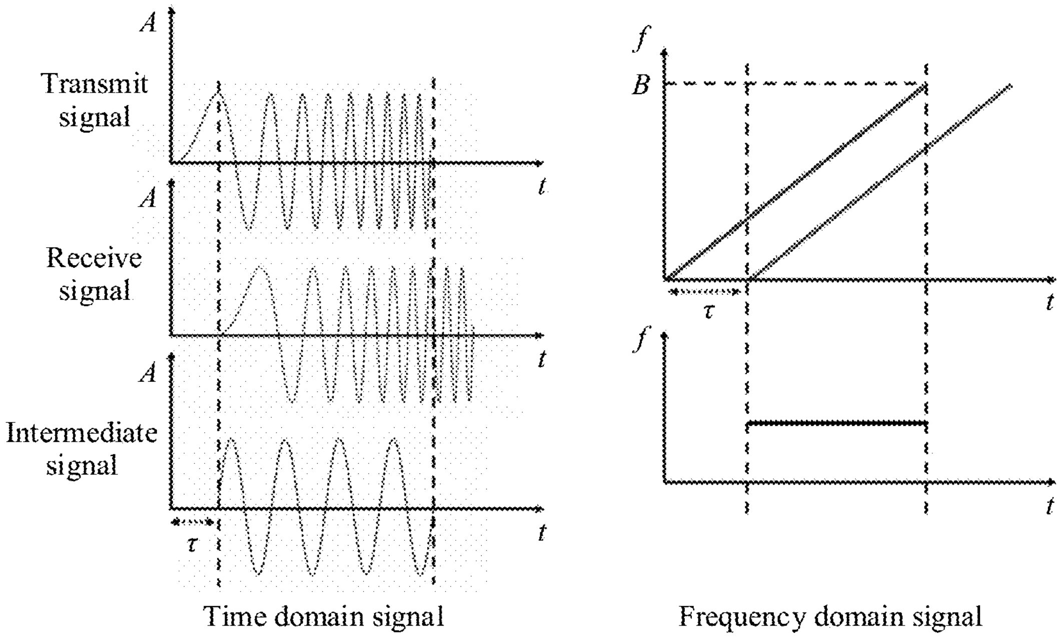
FIG. 14 is a schematic diagram of a manner of obtaining an intermediate frequency signal according to this application.

A manner of extracting an intermediate frequency signal may be shown in FIG. 14.

Transmitting a signal by the radar may be expressed as:

$$s_T(t) = \exp\left(j2\pi\left(f_c t + 0.5kt^2\right)\right)$$

$f_c$ is a signal carrier frequency, k is a modulated signal frequency, $$k = \frac{B}{T},$$

B is a signal bandwidth, and T is a signal pulse width.

Receiving a signal by the radar may be expressed as:

$$s_R(t) = \exp\left(j2\pi\left(f_c(t-\tau) + 0.5k(t-\tau)^2\right)\right)$$

τ is a delay of receiving the signal, where $$\tau = \frac{2(R + v_r t)}{c}\#$$

R is a target distance, $v_r$ is a target radial speed, and c is the speed of light.

Frequency mixing is performed on the transmit signal and the receive signal, to obtain a signal with a higher frequency and a signal with a lower frequency. Then, the two signals are processed by a low-pass filter, to obtain the intermediate frequency signal:

$$s_{IF}(t) = \exp\left(j2\pi\left(f_c\tau - 0.5k\tau^2 + kt\tau\right)\right)$$

τ is is substituted, to obtain:

$$s_{IF}(t) = \exp\left\{j2\pi\left[f_c\frac{2(R+v_r t)}{c} - \frac{4k(R+v_r t)^2}{2c^2} + kt\frac{2(R+v_r t)}{c}\right]\right\}$$

Because a denominator of the second item is large and the second item can be ignored, the formula can be simplified, to obtain:

$$s_{IF}(t) = \exp\left\{j2\pi\left[\frac{2kv_r}{c}t^2 + \left(\frac{2f_c v_r + 2kR}{c}\right)t + \frac{2Rf_c}{c}\right]\right\}$$

It can be learned that the intermediate frequency signal obtained through frequency mixing and low-pass filtering is still a chirp signal. However, because a time-bandwidth product is small, the intermediate frequency signal may be approximately equivalent to a single-frequency signal:

$$s_{IF}(t) = \exp\left\{j2\pi\left[\left(\frac{2f_c v_r + 2kR}{c}\right)t + \frac{2Rf_c}{c}\right]\right\}$$

A center frequency is $(f_c v_r+2kR)/c$, and is affected by Doppler effect generated by the distance and the speed of the target.

Figure 15:
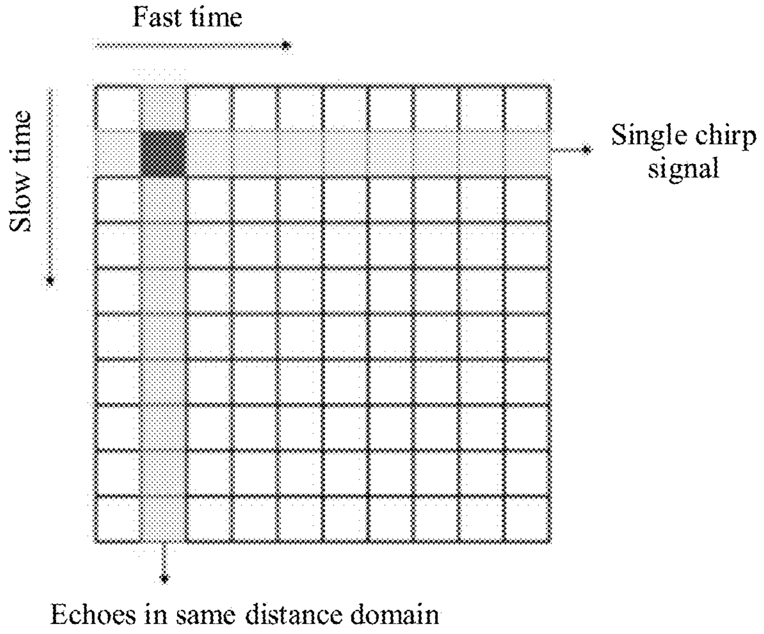
FIG. 15 is a schematic diagram of echo data according to this application.

A storage form of the echo data may be shown in FIG. 15. Each row of a matrix is a chirp signal, a plurality of chirp signals are superimposed in rows, to form gesture data, and each column indicates echoes of a same distance.

1302: Filter Interference.

Usually, the background and another moving object may exist to interfere gesture recognition. Therefore, after the echo data of the radar is obtained, the echo data may be filtered, and the background and the another moving object in the echo data are filtered out, to obtain gesture data with less interference.

Specifically, the echo data may be filtered in a dimension such as a speed, a distance, an angle, a position, amplitude, a period, a frequency, a phase, or an acceleration, to filter out information, in the echo data, about the background, a moving object, or a static object whose speed, distance, angle, position, amplitude, period, frequency, phase, or acceleration is not in a preset range.

For example, a filtering manner performed in a distance dimension and a speed dimension is described in the following.

1. Distance Dimension

Figure 16:
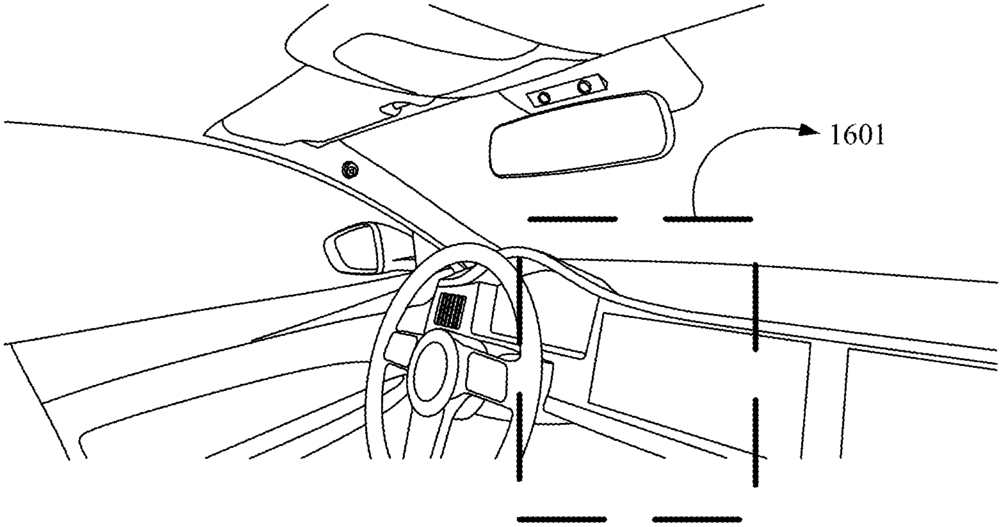
FIG. 16 is a schematic diagram of a structure of another vehicle according to this application.
Figure 17:
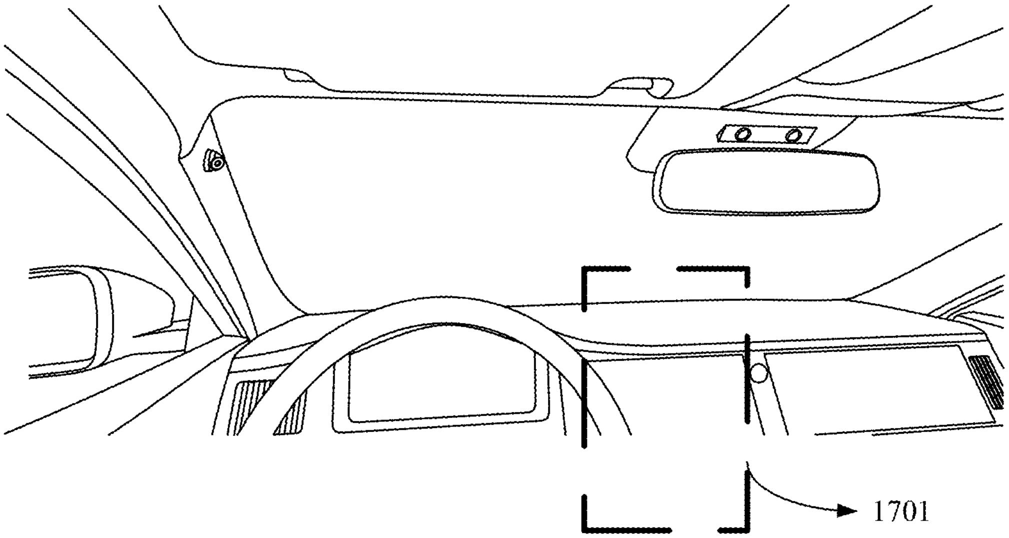
FIG. 17 is a schematic diagram of a structure of another vehicle according to this application.

For example, a millimeter-wave radar has a large detection distance. In a gesture recognition application scenario in a vehicle, a radiation range of the radar may include a body of a user. Therefore, during driving, a plurality of actions (for example, a body action of a driver, and breathing of the driver) of the body interfere with a gesture recognition system, and the targets need to be filtered out. For different radar deployment manners in the scenario, ranges of the filtering manner performed in the distance dimension are different. As shown in FIG. 16, for a first deployment manner, an operating space of a gesture is 1601 shown on the right side of the steering wheel in FIG. 16, and an irradiation direction of a radar beam is the right oblique side in the vehicle with a range of 10 cm to 50 cm. As shown in FIG. 17, for a second deployment manner, an operating space of a gesture is 1701 shown on the right side of the steering wheel, and an irradiation direction of a radar beam is the left oblique side in the vehicle with a range of 0 cm to 40 cm.

Obtaining the target distance: A single echo is extracted from the echo data (as shown in (a) in FIG. 18), and a time domain image of the echo is shown in (b) in FIG. 18. In a chirp signal, because the target speed is negligible compared with a speed of an electromagnetic wave, the intermediate frequency signal can be simplified as follows:

$$s_{IF}(t) = \exp\left[j2\pi\left(\frac{2kR}{c}t\right)\right]$$

Figure 18:
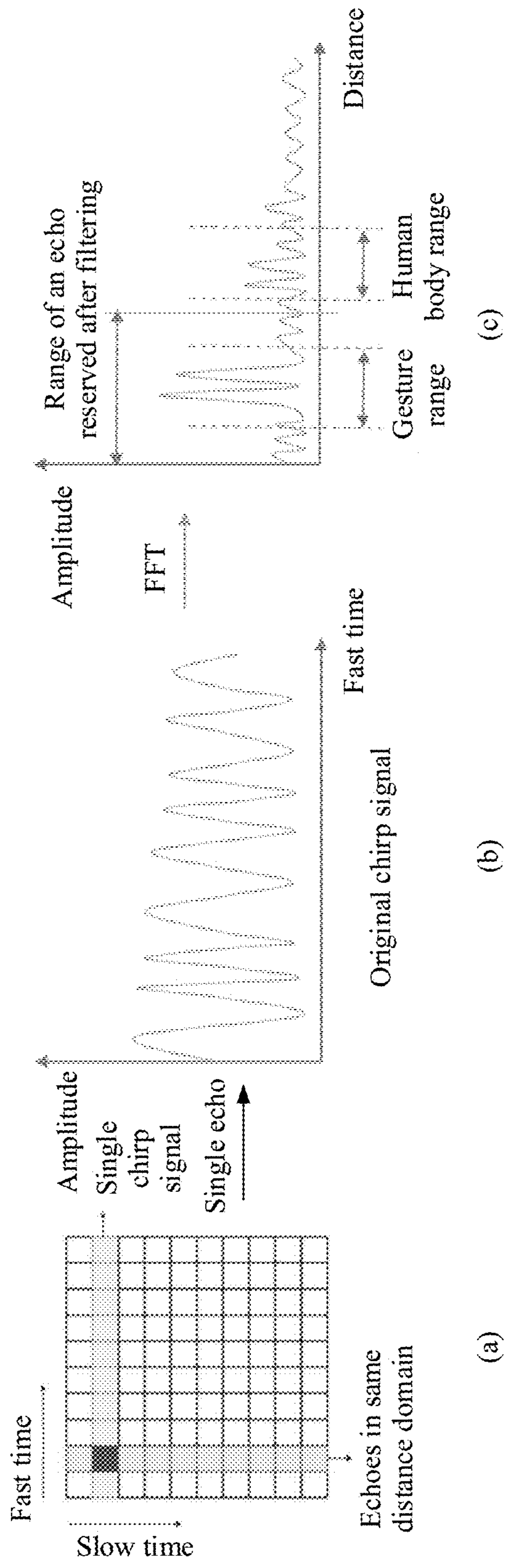
FIG. 18 is a schematic diagram of a manner of computing a signal spectrum according to this application.

Range-FFT is performed on the intermediate frequency signal, to obtain a signal spectrum shown in (c) in FIG. 18. A location of a frequency peak in the signal spectrum is found, to extract a frequency: $f_{IF}$=2kR/c, that is, the frequency is proportional to the target distance. Different frequency ranges indicate different targets, to obtain the target distance: R=c$f_{IF}$/2k.

Figure 19:
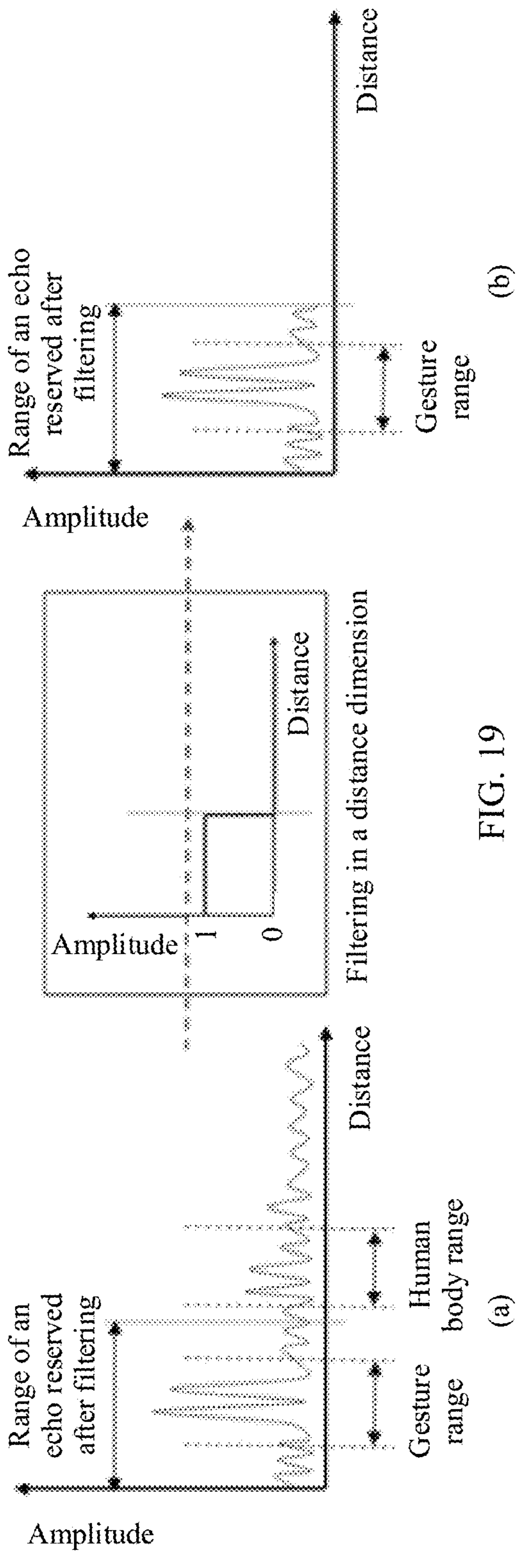
FIG. 19 is a schematic diagram of a manner of detecting a gesture according to this application.

Because in a chirp signal obtained through range-FFT, a horizontal coordinate indicates a distance between the target and the radar shown in (a) in FIG. 18, different frequency peaks indicate echoes of different targets. Echoes in a gesture range and in a human body range are located in different distance domains. Therefore, a distance dimension-based filter shown in the figure may be configured to filter out a body action and undulations of the body during breathing, and only echoes in the gesture range remain. In FIG. 19, a range shown in (a) is a limitation of a gesture in a distance range. For example, a range of the first radar deployment manner is 50 cm, and a range of the second radar deployment manner is 40 cm, namely, a range of the echo that needs to be reserved. (b) in FIG. 19 is effect obtained through filtering performed in the distance dimension.

Therefore, in this implementation of this application, interference data that is in the echo data and that is in a different distance range from the gesture is filtered in the distance dimension, to reserve more data of the gesture in the obtained gesture data, and reduce the interference data. This can improve accuracy of subsequent gesture recognition.

2. Speed Dimension

A static target and a target moving in a slow speed (for example, a display of a vehicle, a static or shaking ornament in a vehicle, or shaking furniture or curtains in a family scenario) in a gesture area are filtered out.

Figure 20:
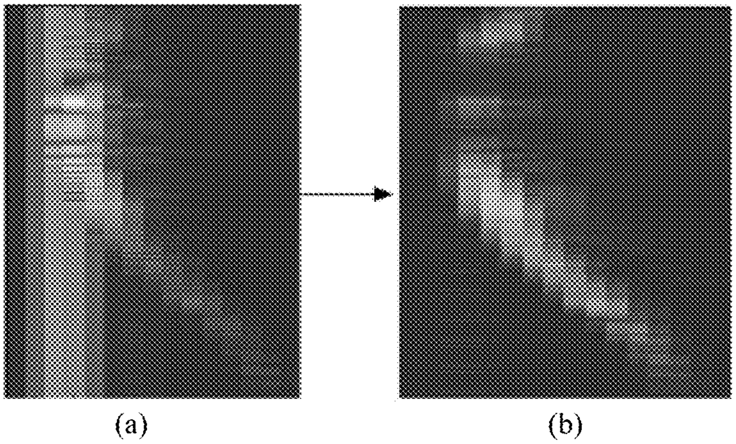
FIG. 20 is a schematic diagram of a filtering manner according to this application.

Usually, movement of a wave source object relative to an observer causes Doppler effect, and a faster relative movement speed indicates a larger Doppler frequency shift. A Doppler frequency shift generated by a relatively static object is zero, but in a conventional filtering manner, no response is made when the frequency is zero, and only a static object whose Doppler shift is zero is removed. In this application, a third-order or higher-order feedback filter is provided, to filter out a static object, and broaden a response near a frequency with a value of zero, so as to remove an object moving in a slow speed. Effect is shown in FIG. 20.

Each row indicates an image obtained after a single chirp signal is processed by using range-FFT. (a) in FIG. 20 is an unprocessed echo, and a plurality of pieces of clutter information are mixed with a gesture, which seriously interferes with extraction of gesture information. (b) in FIG. 20 is an echo obtained through filtering, and clutter is removed. The gesture information is displayed completely.

Figure 21:
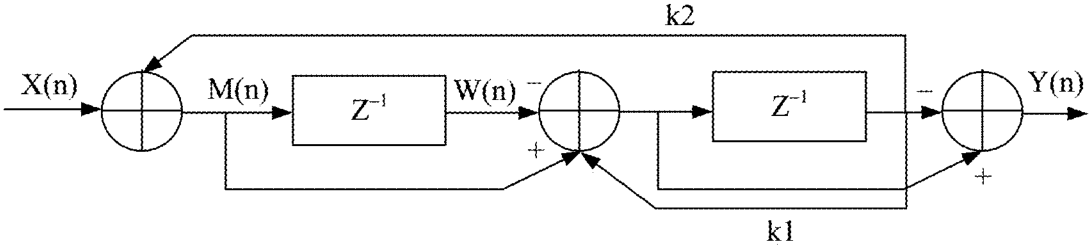
FIG. 21 is a schematic diagram of a structure of a second-order feedback filter according to this application.

Usually, if a first-order or second-order feedback filter is used for filtering, there are some limitations in filtering static and slow-speed targets. For example, a principle of a second-order feedback canceller is as follows: A previous feedback echo is subtracted from a current feedback echo. A specific construction process of the second-order feedback filter may be described in FIG. 21. A filtering process of the second-order feedback filter may be expressed as:

$$M(n) = X(n) - k2W(n-1);$$

$$M(n) = M(n) - M(n-1) + k1W(n-1); \text{ and}$$

$$Y(n) = W(n) - W(n-1), \text{ where}$$

$k1k$ and $k2$ are feedback coefficient.

In this application, at least a third-order feedback filter may be used. The following uses a fourth-order feedback filter as an example for description.

Figure 22:
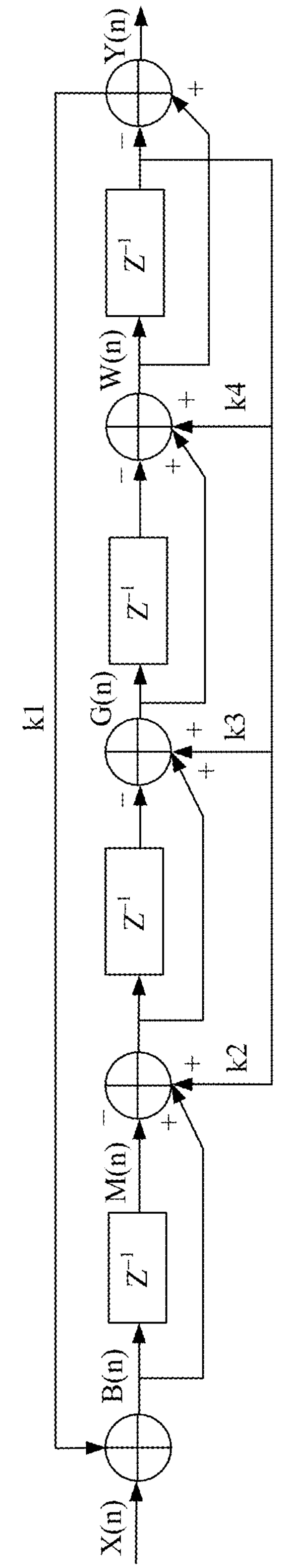
FIG. 22 is a schematic diagram of a structure of a fourth-order feedback filter according to this application.

Usually, to enhance a capability of filtering a low-speed interference target in a complex scenario, and improve performance of the filter, a fourth-order or higher-order feedback filter is provided, and specific feedback is added to a signal. As shown in FIG. 22, the fourth-order feedback filter may be expressed as:

$$B(n) = X(n) + k1W(n-1);$$

$$M(n) = B(n) - B(n-1) + k2W(n-1);$$

$$G(n) = M(n) - M(n-1) + k3W(n-1); \text{ and}$$

$$W(n) = G(n) - G(n-1) + k4W(n-1).$$

Because movement of an object causes a Doppler frequency shift, and a faster speed indicates a larger Doppler frequency shift. When a response to a frequency of the filter is zero at a speed, a signal at the speed may be filtered out.

Figure 23:
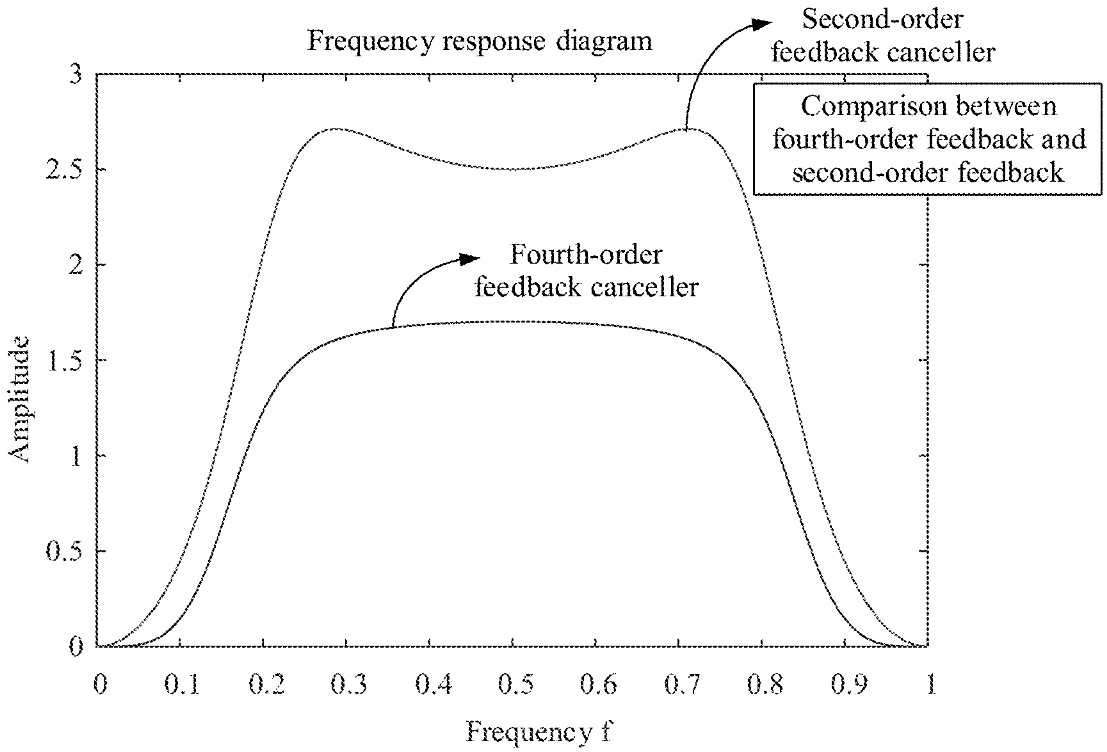
FIG. 23 is a schematic diagram of comparison of effect of a second-order feedback filter and effect of a fourth-order feedback filter according to this application.

FIG. 23 shows comparison of effect of a second-order feedback filter.

It can be learned that although the second-order canceller also has a wide suppression notch with a strong suppression capability for a static target, a gain difference in a passband is large, and an echo of a moving target may be suppressed.

In comparison with a frequency response of the second-order feedback filter, the fourth-order feedback filter broadens a response near a frequency with a value of zero by nearly 25%. Therefore, both a static object and some slow-speed clutter can be filtered out, a response of the fourth-order feedback filter in the band is more uniform, and the fourth-order feedback filter has better stability. Therefore, in this implementation of this application, the fourth-order or higher-order feedback filter is used, to implement better filtering effect on an object moving in a slow speed, and obtain gesture data with less interference data. This can improve accuracy of subsequent recognition. In addition, in this implementation of this application, when the finger of the user forms a micro-gesture, the third-order or higher-order feedback filter may be used for filtering, so that a static object and a slow-speed object can be more clearly distinguished, to obtain more accurate micro-gesture information, and improve a micro-gesture recognition success rate.

In addition, filtering may further be performed in a dimension such as an angle (for example, a pitch angle or an azimuth), amplitude, or a frequency. A filtering manner in another dimension is similar to the foregoing filtering manners in the distance dimension and the speed dimension, that is, data that is not in a same range as the gesture is filtered out, so that finally obtained gesture data includes less interference data. This can improve accuracy of subsequent gesture recognition.

1303: Detect a Start Gesture and an End Gesture.

After the echo data is filtered, the gesture data obtained after the background or another moving object is filtered out may be obtained. Then, a part in which the user performs a gesture operation may be captured from the gesture data, to reduce redundancy in the gesture data.

Specifically, positions of the start gesture and the end gesture may be determined from the echo data, and then data between data of the start gesture and data of the end gesture is captured, to obtain new gesture data. The data of the start gesture is data formed by the start gesture in the echo data. The data of the end gesture is data formed by the end gesture in the echo data.

In one embodiment, information in which a variance is greater than a first preset value in the gesture data may be used as information about the start gesture, and information in which a variance of one frame or a plurality of continuous frames (for example, at least three continuous frames) in the gesture data is less than a second preset value may be used as information about the end gesture. It is clear that when a gesture is detected, the gesture may be used as a start gesture.

Therefore, in this implementation of this application, a quick response may be made to a gesture operation of the user. In comparison with starting a gesture operation by using a fixed activation gesture, an operation delay caused by a fixed activation gesture can be avoided in this application, and a quick response may be made to a gesture operation of the user. This can improve user experience.

Figure 24:
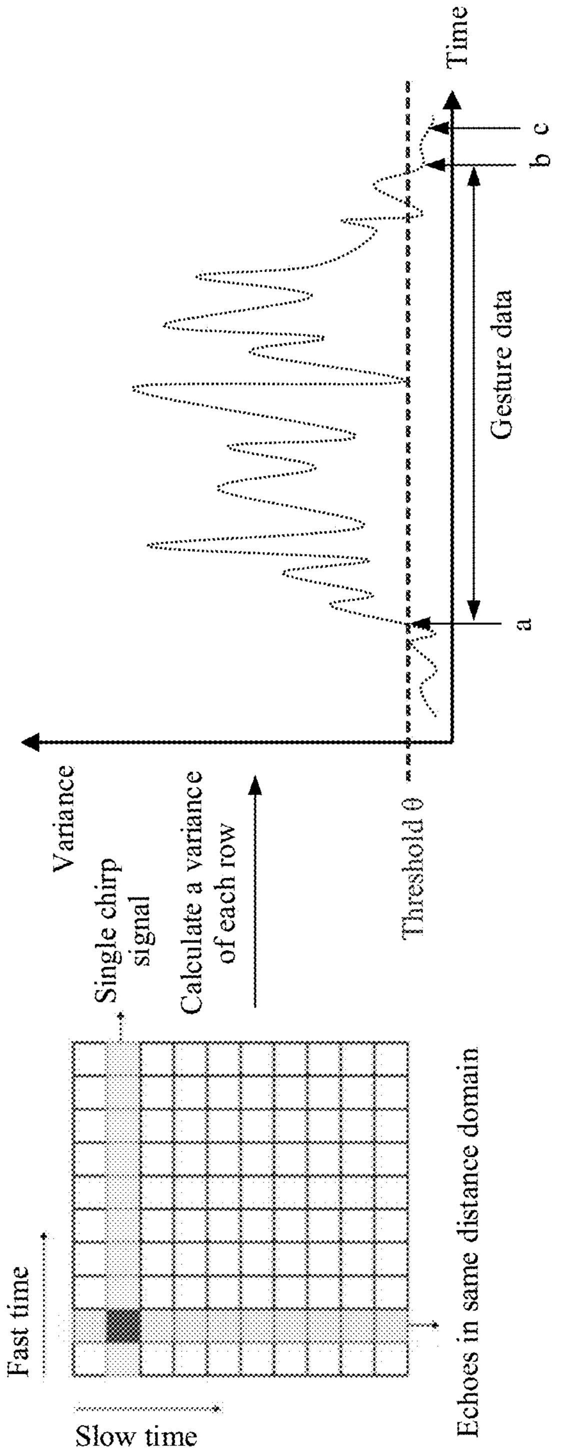
FIG. 24 is a schematic diagram of another manner of detecting a gesture according to this application.

For example, a manner of determining the start gesture may include: Usually, a variance may be calculated for each chirp in the gesture data after an interference object is filtered out. Because an echo variance when there is a gesture increases significantly compared with a variance when there is no gesture, the feature may be used to determine a start moment and an end moment of a gesture. Therefore, when there is a gesture, the echo variance increases. When an echo variance of radar signal data is greater than a set threshold θ (which is related to a maximum noise value, and is about 120% of the maximum noise value), it is determined that a chirp data point is a start moment of the gesture. As shown in the following figure, an echo variance of radar signal data at a point is greater than the threshold θ, and radar wave data from this point, namely, a point a shown in FIG. 24, is determined as the gesture data.

For example, a manner of determining the end gesture may include: Because a gesture operation may temporarily stop when the gesture operation is performed, a variance in a time period may be less than a threshold (for example, data from a point b to a point c in FIG. 24). If the data is included in radar signal data for gesture recognition, redundant data exists, and a calculation amount increases. Therefore, an end marker of the gesture is set to that echo variances of n continuous chirps (about ⅓s) are less than the threshold θ (as shown in FIG. 24, if echo variances of n continuous frames from the point b are less than the threshold θ, the point b is marked as an end gesture). After it is determined that an echo of a gesture is received, an end point (the point c shown in FIG. 24) after the n chirps is not used as the end gesture, but a last echo less than the threshold is used as an end point (the point b shown in FIG. 24) of the gesture data.

1304: Extract a Movement Parameter

After the gesture data is obtained, the movement parameter may be extracted from the gesture data. The movement parameter is movement feature information of the object in the detection range of the radar, and includes a parameter generated when the object moves in the detection range.

The movement parameter may include one or more of a speed, a distance, an angle, a position, amplitude, a period, a frequency, a phase, an acceleration, or the like. For example, the following describes extraction manners by using a distance, a Doppler frequency shift, and an angle as examples.

1. Distance Information Extraction

When filtering is performed in operation 1302, if distances between a plurality of objects in the echo data are calculated, in this operation, distance information of the objects that is calculated in operation 1302 may be directly reused. If the distance information of the objects is not calculated, distances between the objects and the radar may be calculated.

For example, a specific manner of calculating the distance may include:

The distance information is included in a frequency of each echo pulse, and fast Fourier transform may be performed on a single pulse based on a fast time dimension, to obtain distance information of a gesture in the current pulse. Distance information in each pulse may be integrated, to obtain overall distance change information of a single gesture.

The intermediate frequency signal can be simplified as:

$$s_{IF}(t) = \exp\left[j2\pi\left(\frac{2kR}{c}t\right)\right] \#$$

The signal spectrum may be obtained through FFT, and a peak in the spectrum can be found:

$$f_{IF} = \frac{2kR}{c} \#$$

The peak is proportional to a target distance, to obtain the target distance:

$$R = \frac{cf_{IF}}{2k}$$

Figure 25:
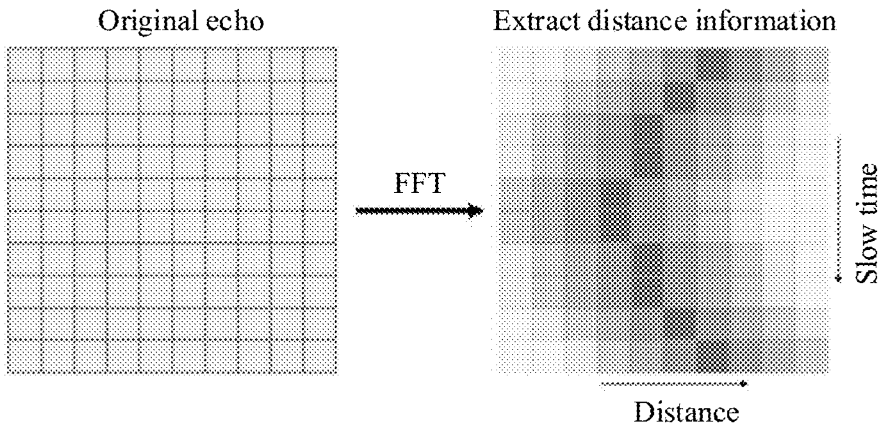
FIG. 25 is a schematic diagram of a manner of extracting a distance according to this application.

The distance extraction manner may be shown in FIG. 25. A distance between each object and the radar is obtained through calculation according to the algorithm by using the gesture data from which interference is filtered out, to obtain a plane distance matrix in the detection range. Each value in the matrix indicates a distance between the radar and an object in a corresponding position, the distance matrix may be represented in a form of a two-dimensional image, and each distance is used as a pixel value of a pixel.

2. Doppler Information Extraction

A commonly used Doppler map represented by a distance can only indicate changes of distance and speed information without angle information. For a gesture varying with time, a plurality of distance Doppler images need to be sampled and captured in time. If sampling is extremely dense, a data amount is extremely large, and real-time performance cannot be ensured. If sampling is extremely sparse, gesture information may be omitted.

For the foregoing problems, in this embodiment, a plurality of features of time domain, a frequency, and a space domain are analyzed, feature differences of different gestures are effectively extracted, and a gesture feature whose distance, speed, and angle vary with time is proposed, and is used as input data of a subsequent neural network for learning.

A specific manner of extracting Doppler information may include: after performing FFT (fast Fourier transform) on the gesture data based on a fast time dimension, performing STFT (short-time fast Fourier transform) on the gesture data based on a slow time dimension, where a peak value indicates a Doppler frequency shift of the target.

FFT based on a slow time dimension needs to be performed in a same range gate. Because overall movement of the target has range cell migration, and FFT cannot be directly performed on a specific range gate of the overall gesture (a speed and a distance are coupled), a quantity of accumulated pulses (empirical value) needs be appropriately set, so that range cell migration does not exist in gesture interception during each FFT operation.

In this application, time-frequency analysis of a gesture signal is completed through short-time fast Fourier transform, to extract Doppler information of the gesture, and appropriately design a quantity of accumulated pulses, that is, appropriately set a window length of short-time fast Fourier transform.

For the Doppler information extraction process in this application, FFT based on a fast time dimension may first be performed on the gesture data, to obtain the distance information. Then, data at a peak of each pulse is extracted and rearranged into a column, and time-frequency analysis is performed on the column of data by using STFT, to obtain a Doppler change rule of a single gesture.

If the target is in a moving status, $$f_{IF} = \frac{2f_c v_r + 2kR}{c}$$

The signal frequency includes both the distance and speed information, that is, the distance and the speed are coupled. The distance and the speed cannot be obtained directly through one-dimensional FFT. It is assumed that a signal sampling period is $T_s$, a pulse repetition spacing is T, and a quantity of sampling points of a single pulse is N. When L pulses are received, the foregoing formula is rewritten as:

$$s_{IF}(n, l) = \exp\left\{j2\pi\left[\left(\frac{2f_c v_r}{c} + \frac{2k(R + v_r lT)}{c}\right)nT_s + \frac{2(R + v_r lT)f_c}{c}\right]\right\}$$

n=0, 1, 2, . . . , N−1, n indicates a sampling point sequence of a single pulse, l=0, 1, 2, . . . , L−1, and l indicates a pulse sequence.

It can be learned that the phase of the signal carries the speed information, and the phase is represented in a form of a signal complex envelope after one-dimensional FFT is performed. Therefore, after one-dimensional FFT is performed, two-dimensional FFT (that is, slow time is used as a variable) is performed on the signal, to obtain a center frequency (namely, a Doppler frequency shift of an echo corresponding to the gesture) of the signal indicating a target speed:

$$f_d = \frac{2f_c v_r}{c} = \frac{2v_r}{\lambda}$$

$$v_r = \frac{f_d \lambda}{2}$$

Time-frequency analysis of a signal is describing a composition manner and frequency components of the signal in each time range. Because a static signal is usually ideal or artificially made, but a common signal is not stable, fast Fourier transform is not enough to analyze the signal, and usually using time-frequency analysis Short-time fast Fourier transform (STFT) uses a segment of signals in a time window to indicate a feature of a signal at a specific moment.

During short-time fast Fourier transform, a time resolution and a frequency resolution of a time-frequency map are determined by a window length. A larger window length causes a larger length of an intercepted signal, so that a higher frequency resolution obtained through STFT indicates a lower time resolution.

A specific operation may include: first multiplying a function and a window function by using short-time fast Fourier transform, and then performing one-dimensional fast Fourier transform. A series of Fourier transform results are obtained by sliding the window function, and the results are rearranged, to obtain a two-dimensional image whose horizontal axis is time domain and whose vertical axis is frequency domain. It is assumed that s(t) is a to-be-analyzed signal, STFT(t, ω) is a signal time-frequency analysis result, and the short-time fast Fourier transform formula may be expressed as:

$$STFT(t, \omega) = \int s(t')\omega(t' - t)e^{-j\omega t'}\,dt'$$

A peak value may indicate the Doppler frequency shift of the target.

It can be learned from the foregoing formula that, when STFT is used, a window length needs to be set, and the window length affects the time resolution and the frequency resolution. A small window length is suitable for a high-frequency signal, to obtain a high resolution in time domain. A large window length is suitable for a low-frequency signal, to obtain a high resolution in frequency domain.

Figure 26:
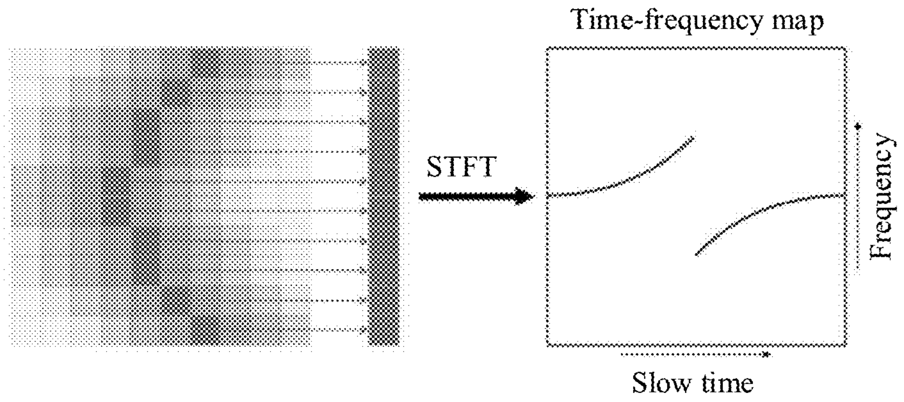
FIG. 26 is a schematic diagram of a manner of extracting Doppler information according to this application.

The Doppler information extraction manner may be shown in FIG. 26. After FFT and STFT are performed, a relationship between the time and the speed can be obtained, and a two-dimensional image (namely, a time-frequency image) may indicate a frequency of each object in a plane corresponding to the detection range of the radar.

Therefore, in this implementation of this application, FFT is performed based on a fast time dimension, and STFT is performed based on a slow time dimension, to extract a frequency shift generated by a small change. This can greatly improve accuracy of gesture recognition, and improve user experience.

3. Angle Information Extraction

Figure 27:
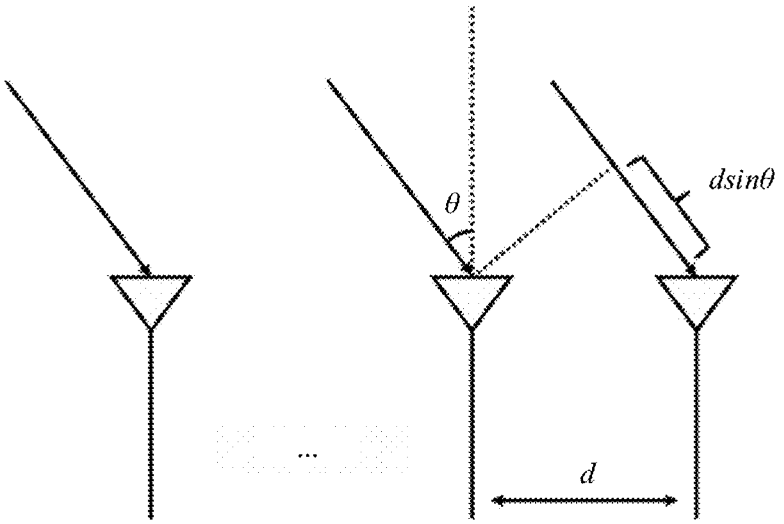
FIG. 27 is a schematic diagram of a manner in which a radar receives an echo signal according to this application.

The angle may include an azimuth and a pitch angle, a phase difference of each received echo is measured by using a multiple input multiple output antenna of the radar, to obtain the angle. FIG. 27 is a schematic diagram of receiving an echo of a target by the multiple input multiple output antenna. There may be an angle θ between an echo signal and a receive antenna due to a position of a reflected object. The angle θ may be obtained through calculation, to learn of a specific position of the reflected object and a position change of the object.

The angle may be calculated in a plurality of manners, for example, establishing a coordinate system centered around the radar, calculating a position of the object in the coordinate system based on the echo data, to obtain a pitch angle or an azimuth. In this application, a multiple signal classification (multiple signal classification, MUSIC) algorithm may be used as an example to calculate an angle, including a pitch angle or an azimuth. A four-channel receive antenna array of a radar is used to measure an angle change of a gesture.

Different from a manner of directly processing a covariance matrix of a signal received by the array, the MUSIC algorithm is used to perform feature decomposition on a covariance matrix of output data of any array, to obtain a signal subspace corresponding to a signal component and a noise subspace orthogonal to the signal component. Then, orthogonality of the two subspaces is used to estimate signal parameters such as an incident direction, polarization information, and signal strength. The MUSIC algorithm has advantages of universal applicability, high precision and simultaneous measurement of a plurality of signals.

With reference to FIG. 27, the following describes an example of a specific manner of calculating an angle by using the MUSIC algorithm.

Figure 28:
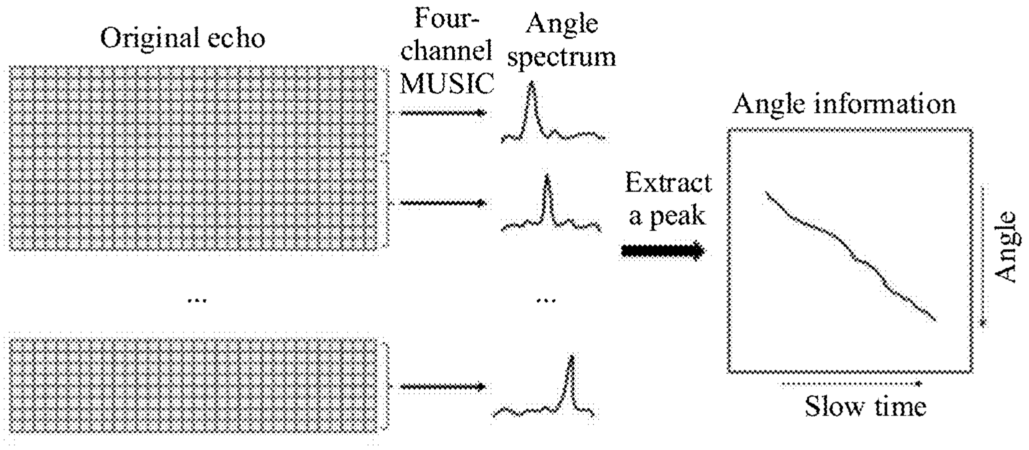
FIG. 28 is a schematic diagram of a manner of extracting an angle according to this application.

For example, an angle extraction manner may be shown in FIG. 28. Four-channel MUSIC method is performed on an echo from which inference is filtered out, to calculate an angle spectrum, and then angle information is extracted from the angle spectrum.

A more specific algorithm may include: A quantity of array elements in a linear array of the radar is K, a spacing is d, and a delay of receiving signals by two array elements is dsinθ/c. It is assumed that there are M targets, angles of the targets are separately $\theta_m$, m=1, . . . , M, and signals received by the M targets are:

$$S(t) = [S_1(t), S_2(t), \dots , S_M(t)]^T$$

Direction vectors of the signals are: $A=[\alpha(\theta_1), \alpha(\theta_2), \dots, \alpha(\theta_M)]=$ $$\begin{bmatrix} 1 & 1 & \dots & 1 \\ e^{-j\varphi_1} & e^{-j\varphi_2} & \dots & e^{-j\varphi_M} \\ \dots & \dots & \dots & \dots \\ e^{-j(K-1)\varphi_1} & e^{-j(K-1)\varphi_2} & \dots & e^{-j(K-1)\varphi_M} \end{bmatrix}, \text{ where}$$

$$\varphi_m = \frac{2\pi d}{\lambda}\sin\theta_m$$

It is assumed that a noise vector of the array element is:

$$N(t) = [n_1(t), n_2(t), \dots , n_K(t)]^T$$

It can be obtained that the received signal is:

$$X(t) = AS(t) + N(t)$$

It is assumed that the signals of the array elements are not correlated, a covariance matrix of the received signal is:

$$R = E[XX^H] = APA^H + \sigma^2 I$$

$P=E[SS^H]$, and is a signal correlation matrix, $\sigma^2$ is noise power, and I is a $(K\times K)^{th}$-order identity matrix. Because R is a full-rank matrix and a feature value is positive, a feature of R is decomposed, to obtain a feature vector $v_i$(i=1, 2, . . . , K). Because the noise subspace is orthogonal to the signal subspace, a noise feature vector is used as a column to construct a noise matrix:

$$E_n = [v_{M+1}, \dots , v_K]$$

A spatial spectral function is defined as:

$$P_{mu}(\theta) = \frac{1}{a^H(\theta)E_nE_n^H a(\theta)}$$

When $\alpha(\theta)$ is orthogonal to each column of $E_n$, a denominator is a minimum value. Therefore, $P_{mu}(\theta)$ may be searched for a spectral peak, and an angle of arrival is estimated by searching for the peak.

Based on the multiple input multiple output antenna of the radar, an angle change of a gesture can be obtained by using the MUSIC algorithm. For example, eight pulses are used for each angle calculation process, that is, eight original echo pulses of an echo received by a single channel are first spliced:

$$X_i = [x_{i1}, x_{i2}, \dots , x_{iN}]$$

N=4096, namely, a total length of eight pulses, and i is a channel sequence number. Then, data of the four channels is combined, to obtain an input matrix of the MUSIC algorithm:

$$X = \begin{bmatrix} X_1 \\ X_2 \\ X_3 \\ X_4 \end{bmatrix}$$

Angle distribution of the gesture corresponding to the echo signal is obtained by using the MUSIC algorithm. The foregoing operations are performed on every eight pulses in all echoes, to obtain angle information of a single gesture in all phases.

Therefore, in this implementation of this application, information such as Doppler information, and information such as a distance or an angle that may indicate movement of an object or a position change in a space may be extracted in a plurality of manners, to indicate a change of a gesture in a space, so as to facilitate subsequent gesture recognition.

1305: Extract the Feature.

After the distance information, the Doppler information, or the angle information is obtained, at least two of the distance information, the Doppler information, or the angle information may be fused, and each type of information is used as one piece of channel information, to obtain a multi-channel feature image. Then, the three-channel feature image is input to a feature extraction network, to extract the gesture feature information.

Figure 29:
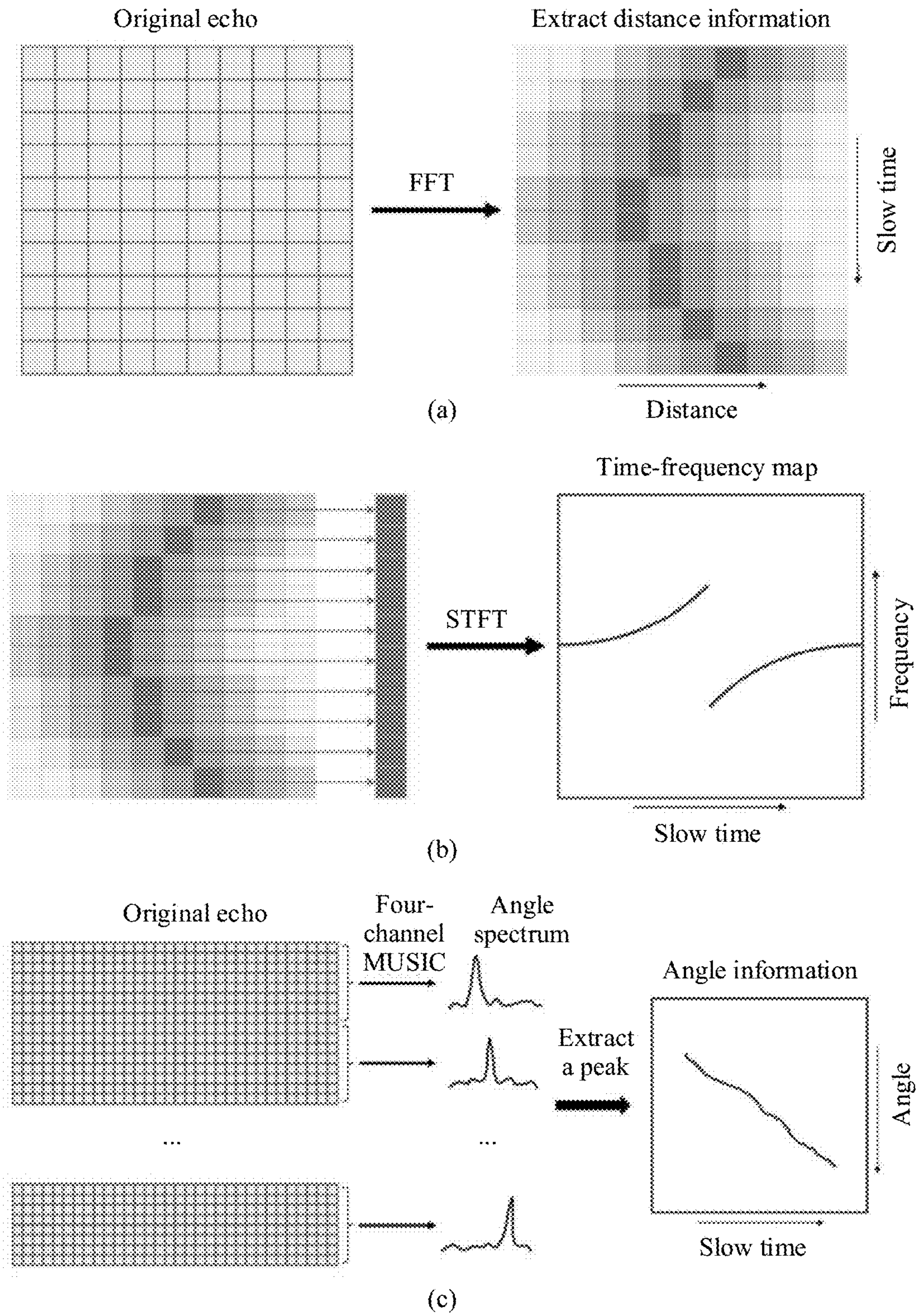
FIG. 29 is a schematic diagram of a manner of generating an image according to this application.

Usually, after a movement parameter corresponding to the gesture is obtained, the parameter may be converted into an input form of the neural network. For example, effect of a deep learning algorithm depends on quality of a database sample. Therefore, after the movement parameter is extracted, a boundary value of the parameter of the gesture in a period of time may be stored in a form of a two-dimensional image. As shown in FIG. 29, (a) is extracting the distance information into a two-dimensional image, that is, each distance in a distance matrix is used as a value of a pixel, to obtain the two-dimensional image, (b) is extracting the speed information into a two-dimensional image, and (c) is extracting the angle information into a two-dimensional image.

After the two-dimensional image is obtained, to facilitate subsequent processing, the two-dimensional image may be normalized, for example, size normalization or pixel value normalization. In other words, a size or a pixel value is converted into a preset range based on a preset mapping relationship, to obtain a normalized image.

Size normalization is, for example, unifying sizes of images, to facilitate subsequent deep learning algorithm training. Most deep learning networks have a fully connected layer, and a quantity of parameters is related to a size of input data. Therefore, data of a same size needs to be input during training and testing. For example, in this application, a size of the image may be reset to 224×224.

Pixel value normalization is, for example, normalizing pixel value ranges of images. The two-dimensional image in this application is usually a single-channel grayscale image. Ranges of grayscale values of different sample images are different, which is unfavorable to algorithm training. In this application, a min-max normalization manner may be used to map a grayscale value of an image to a range [0, 1]. Specifically, it is assumed that a grayscale value matrix of an image in a database is X, and $x_{ij}$ is a grayscale value of a single pixel:

$$x_{ij} = \frac{x_{ij} - \min(X)}{\max(X) - \min(X)}$$

An image whose pixel values are normalized is obtained.

After the images corresponding to the normalized distance, angle, or Doppler frequency shift are obtained, the images corresponding to the distance, the angle, or the Doppler frequency shift may be separately used as channels for splicing, to obtain a three-channel feature image. It may be understood that three types of information of a single gesture are stacked, to obtain information in a three-channel format that is similar to a three-channel RGB image that is usually input by a deep learning algorithm in computer vision, and the information is used as a data input of the single gesture. Then, the feature extraction network is used to extract a feature of the input image, to obtain gesture feature data.

Specifically, the following describes a manner of performing feature extraction by using the feature extraction network.

First, the feature extraction network may be a neural network such as a CNN, a DCNN, an RNNS, a DNN, or an RNN. For example, the neural network may include a plurality of convolutional layers, and a size of a convolution kernel at the convolution layer is 3.

Figure 30:
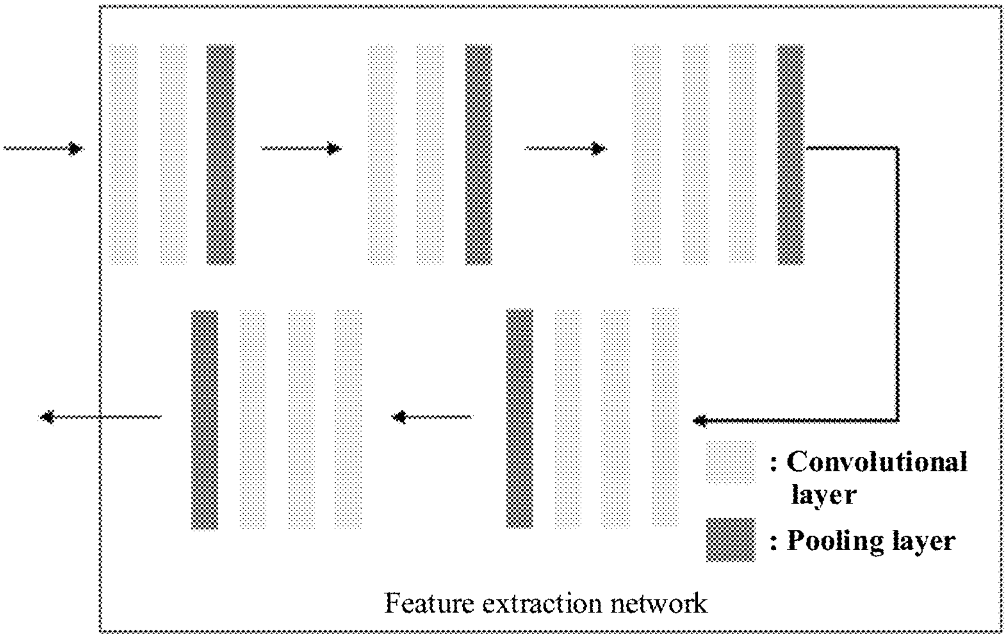
FIG. 30 is a schematic diagram of a structure of a feature extraction network according to this application.

For example, a structure of the feature extraction network may be shown in FIG. 30, and includes a plurality of groups of convolution and pooling operations. During feature extraction, a feature size decreases continuously through each group of convolution operations, a quantity of channels increases continuously, and an ReLU function is used as an activation function.

Figure 31:
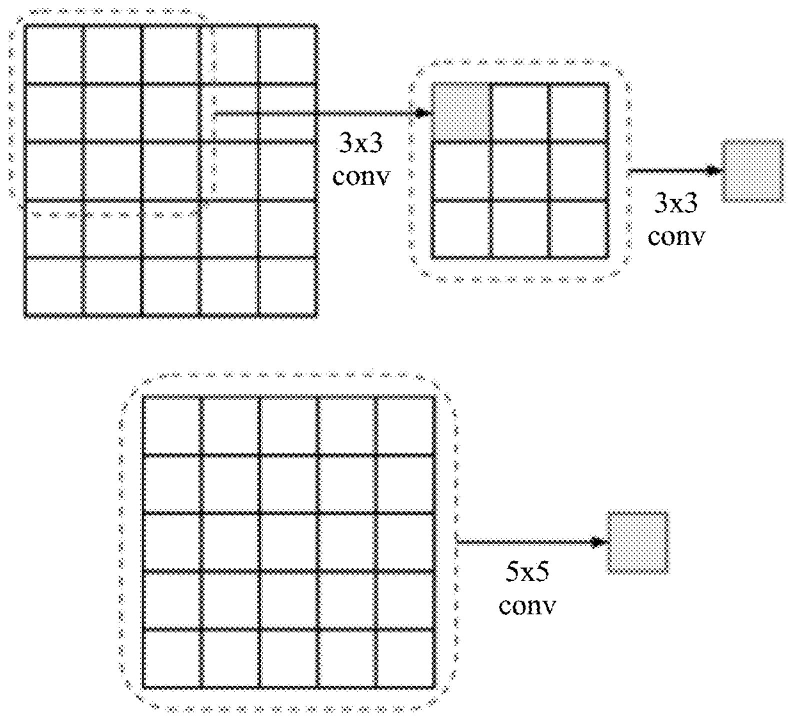
FIG. 31 is a schematic diagram of comparison of receptive fields of different convolution kernels according to this application.

A size of a convolution kernel at the convolution layer in the feature extraction network may be 3×3. Usually, a convolution layer with a small convolution kernel may be used to replace a convolution layer with a large convolution kernel, that is, a stack of convolution kernels with a small receptive field may replace a single layer with a large receptive field. As shown in FIG. 31, a first row shows a size of a receptive field that can be obtained by a convolution operation result of two convolutional layers whose convolution kernel is in a 3×3 size, and a second row shows a size of a receptive field that can be obtained by a convolution operation result of one convolutional layer whose convolution kernel is in a 5×5 size. It can be learned that a single pixel of the final feature output in the two diagrams includes a receptive field in an original size of 5×5, two convolutional layers whose convolution kernel is in a 3×3 size require 18 parameters, and one convolutional layer whose convolution kernel is in a 5×5 size requires 25 parameters. Under a same receptive field, compared with a large convolution kernel, a small convolution kernel can reduce a parameter amount. Similarly, three convolutional layers whose convolution kernel is in a 3×3 size is equivalent to a single convolutional layer whose convolution kernel is in a 7×7 size. A parameter amount of the former is 27, and a parameter amount of the latter is 49. In addition, in comparison with a single-layer network, when a multi-layer network is used to process the feature, the feature is processed by using more nonlinear operations, to improve a learning ability of the network.

In one embodiment, after the feature is extracted by using the feature extraction network, a more accurate gesture feature may be obtained by using a self-attention mechanism.

Figure 32:
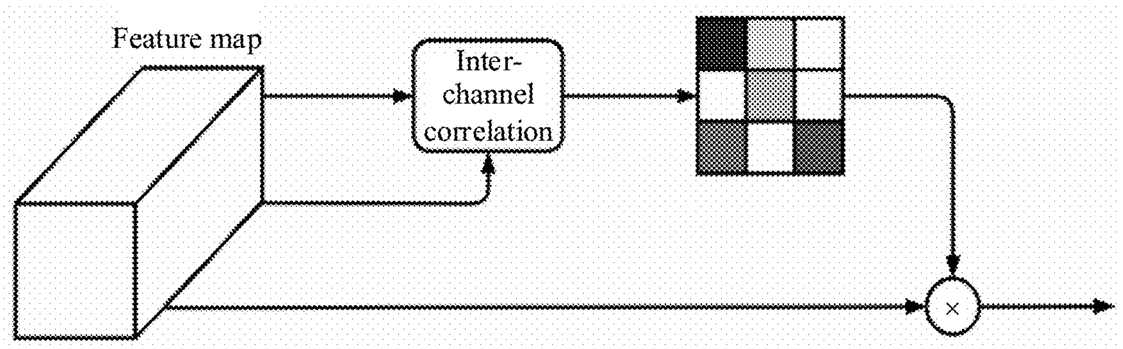
FIG. 32 is a schematic diagram of a manner of computing a self-attention spectrum according to this application.

For example, after feature extraction is completed, the multi-channel feature map is input to a self-attention based feature fusion network. A structure of the feature fusion network may be shown in FIG. 32. A label, a value, and query data of the feature fusion network all come from the gesture feature information extracted by using the feature extraction network.

A specific calculation manner of the feature fusion network may include the following operations.

It is assumed that an input feature map is:

$$F \in \mathbb{R}^{H \times W \times C}$$

H and W are a length and a width of the feature map, and C is a quantity of channels of the feature map. Data of each channel is combined into data of one channel, to obtain:

$$F_c \in \mathbb{R}^{N \times C}$$

N=H×W, and $F_c$ and transposition of $F_c$ are multiplied, to obtain an inter-channel correlation matrix G:

$$G = F_c^T \cdot F_c \in \mathbb{R}^{C \times C}$$

Then, softmax processing is performed on each column of G. Specifically, it is assumed that $G_{ij}$ is each element of G, and a value of each element of the processed matrix $M \in \mathbb{R}^{C \times C}$ is:

$$M_{ij} = \frac{\exp(G_{ij})}{\sum_{j=1}^{C} \exp(G_{ij})}$$

The value is applied to the feature matrix, to obtain an attention spectrum (the attention spectrum has a physical meaning, and can affect importance of a feature of the recognition result):

$$F_{c1} = F_c \cdot M^T$$

The fused attention spectrum is converted into an original size:

$$F_{c1} \in \mathbb{R}^{N \times C} \rightarrow F_{c2} \in \mathbb{R}^{H \times W \times C}$$

An original feature map is combined with the attention spectrum, so that information about the output feature map completely depends on information about the attention spectrum, and a weighted summation manner is used. Specifically, $$F_f = \alpha \cdot F_{c2} + F$$

Proportions of the two features are controlled by using α, α is a parameter that can be learned, and $F_f$ a fused feature.

Feature extraction reduces a data size and increases a quantity of channels. When data is output, inter-channel feature fusion based on the self-attention mechanism is performed, to superimpose attention value information on each channel. Then, by using the fully connected layer and a softmax layer, feature data is represented in a one-dimensional form, and the length is shortened to a quantity of gesture categories, to output a prediction probability of each category of gesture.

Figure 33:
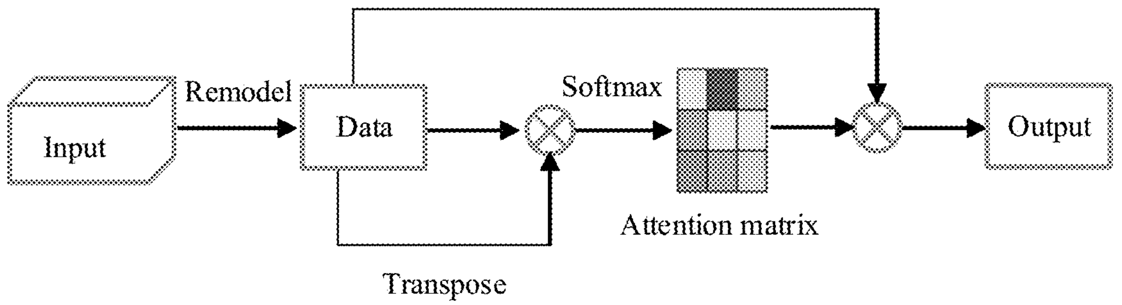
FIG. 33 is a schematic flowchart of gesture recognition according to this application.

For ease of understanding, the following describes an example of a process of obtaining a self-attention spectrum with reference to FIG. 33.

First, after the multi-channel feature image is obtained, the feature image is used as an input of the feature extraction network, and the feature image is remodeled based on a preset size, to obtain remodeled data.

Then, transposition is performed based on the remodeled data, and data obtained through transposition and the remodeled data are multiplied, to obtain the self-attention matrix. Then, the softmax layer is converted into a probabilistic attention matrix. The attention matrix indicates feature importance of each channel, and a larger weight is assigned to a channel that has a similar feature to the channel. This helps highlight feature context information, and improve feature discriminability.

Then, the self-attention matrix is multiplied by the remodeled data, to output the attention spectrum. Therefore, in this implementation of this application, with reference to the self-attention mechanism, correlation calculation is performed on data of each channel in the feature map, to obtain inter-channel dependency of the feature data, where dependency information acts on the original feature map in a form of a product. The parameter that can be learned is introduced, so that the network can adaptively learn effect of attention information on the original data. Channels to output features of the feature extraction network can be better fused by using dependency of channels. In addition, correlation calculation is a global operation of the feature map, and the obtained attention spectrum indicates feature importance of each channel. A larger weight is assigned to a channel that has a similar feature to the channel, to highlight feature context information, and improve feature discriminability. This can improve accuracy of subsequent gesture recognition.

1306: Recognize the Gesture.

After the feature extraction network or the feature fusion network is used, the obtained feature is used as an input of a recognition network, to obtain a prediction result of the gesture.

Figure 34:
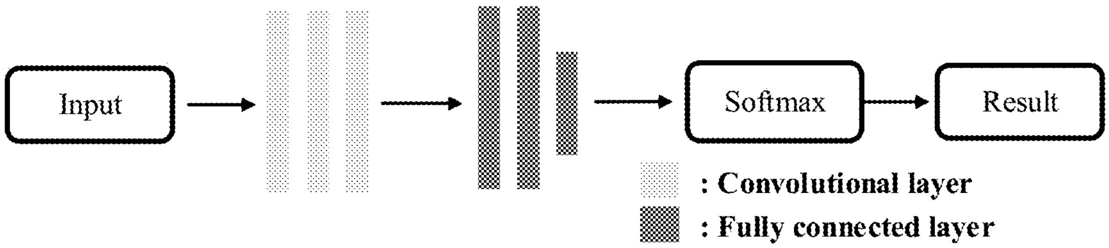
FIG. 34 is a schematic diagram of a structure of a recognition network according to this application.

The recognition network may alternatively use a network including a convolutional layer, a fully connected layer, or a softmax layer. For example, as shown in FIG. 34, the recognition network may include three convolutional layers, three fully connected layers, and one softmax layer. The recognition network first performs a convolution operation on the data obtained through feature fusion, expands the data, and inputs the data to the fully connected layer, so that a dimension of the data is reduced to a one-dimensional vector whose length is equal to a quantity of gesture classification categories. Then, the one-dimensional vector is input to the softmax layer for probabilistic mapping, to finally output prediction probabilities of eight categories of gestures (eight categories of gestures are trained and used in advance, and a specific quantity may be adjusted based on an actual application scenario). An overall data process of the algorithm is completed.

A softmax function is usually used for multi-classification of linear classification in the conventional machine learning field, and is usually used as a prediction output function of multi-classification during deep learning application. The softmax function is essentially extension of a logistic function in a high dimension. It is assumed that X is an input vector whose length is n, $x_i$ is an element, and a formula to calculate a softmax value of each element is as follows:

$$s_i = \frac{\exp(x_i)}{\sum_{i=1}^{n} \exp(x_i)}$$

It can be learned from the formula that $$\sum_{i=1}^{n} s_i = 1$$

In other words, the softmax function maps the input vector value to a vector whose size of each element is between 0 and 1, and sum of each element value is 1, that is, the vector is equivalent to a group of probability distribution data. Therefore, the softmax function may be used as an output function of multi-classification. The output is mapped to probability distribution, so that the output is more physical, rather than only a relative magnitude relationship between feature values. This facilitates calculation of a cross entropy loss function. A cross entropy loss is used to measure a difference between distribution of two probabilities, a true label of the data is processed as a one-hot coding form in specific calculation, a sum of vector elements of the label is also 1, and the label may also be used as probability distribution. Therefore, the prediction output needs to be converted into probability distribution, and the cross entropy can be used for calculation.

In addition, the softmax operation can highlight larger data in a set of data. It is assumed that the input vector is [1, 2, 3], and the output vector is [0.09, 0.24, 0.67]. If the input vector is changed to [1, 2, 5], and the output vector is [0.02, 0.05, 0.93]. After an exponential operation, original large data is highlighted.

In one embodiment, before gesture recognition is performed, the interference gesture may further be input. If the recognized gesture is the interference gesture, no response is made to the gesture, to avoid a misoperation of the user. For example, if the method provided in this application is applied to a vehicle, the user may input some gestures in advance, for example, an action of tapping a button or an action of pulling up a handbrake, that may cause interference to a gesture. Therefore, when the actions are subsequently detected, no response may be made, to reduce a probability of misrecognition. This can improve user experience.

In one embodiment, the interference gesture may alternatively be some gestures that are received from the cloud and that may cause interference to gesture recognition, to skip a process in which the user inputs the interference gesture. This can improve user experience. For example, for a same vehicle model, actions that may cause gesture misrecognition are the same, and interference gestures of the same vehicle model may be searched from the cloud, and applied to the current vehicle. This can improve user experience.

In one embodiment, when a confidence of the recognized gesture is less than a preset confidence, it may be considered by default that recognition fails. In this case, no response may be made to the recognized gesture, to avoid a misoperation of the user or misrecognition. This can improve user experience.

Therefore, in this implementation of this application, first, after filtering is performed in a dimension such as a distance, a speed, or an angle, the interference data in the gesture data is reduced. For example, a body action or undulations of the driver during breathing is filtered out in a driving scenario, to reduce interference to subsequent gesture recognition. This can improve accuracy of gesture recognition. In addition, in the filtering process in the speed dimension, the three-order or higher-order feedback filter is provided to remove the static or slow-speed moving object (for example, a display of a vehicle, a static or shaking ornament in a vehicle, or movement of an object in a vehicle due to driving) in the gesture area, to effectively filter out the slow-speed object, and further reduce interference to subsequent gesture recognition. This can improve accuracy of gesture recognition.

In addition, in this application, the start gesture and the end gesture are further quickly recognized, and a quick response is made to the gesture of the user. This can improve user experience. In comparison with using only a fixed activation gesture to enable gesture recognition, gesture recognition may be quickly triggered in this application. This can improve smoothness of a gesture operation of a user, and improve user experience.

In addition, movement parameters of a plurality of dimensions are extracted and fused, to obtain the multi-channel feature image, to extract a feature with a higher correlation by combining data of the plurality of dimensions. This can improve accuracy of gesture recognition. In addition, the self-attention mechanism is further used. In other words, a correlation between channels is calculated, and correlation features between channels are fused, so that the extracted feature can better indicate a change feature of the gesture. This can further improve accuracy of subsequent gesture recognition.

The foregoing describes in detail the terminal, the vehicle, and the procedure of the recognition method provided in this application. The following describes a structure of a gesture recognition apparatus provided in this application. The gesture recognition apparatus is configured to perform method operations in FIG. 11 to FIG. 34.

Figure 35:
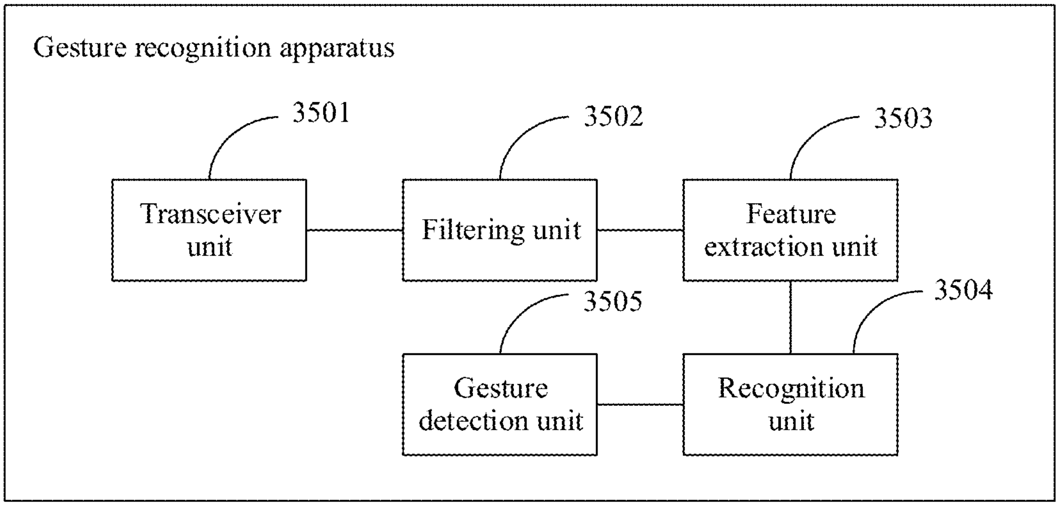
FIG. 35 is a schematic diagram of a structure of a gesture recognition apparatus according to this application.

FIG. 35 is a schematic diagram of a structure of a gesture recognition apparatus according to this application.

The gesture recognition apparatus includes:

- a transceiver unit 3501, configured to obtain echo data of a radar, where the echo data includes information generated when an object moves in a detection range of the radar;
- a filtering unit 3502, configured to filter out, from the echo data, information that does not meet a preset condition, to obtain gesture data, where the preset condition includes a condition corresponding to at least two of a distance, a speed, or an angle, the distance includes a distance between the object and the radar, the speed includes a speed of the object relative to the radar, and the angle includes an azimuth or a pitch angle of the object in the detection range of the radar;
- a feature extraction unit 3503, configured to extract a feature from the gesture data, to obtain gesture feature information; and
- a recognition unit 3504, configured to obtain a target gesture based on the gesture feature information.

In one embodiment, the echo data may include one or more pieces of the following information generated when the object moves in the detection range of the radar: the speed of the object relative to the radar, the distance between the object and the radar, an angle of the object in the detection range of the radar, a position of the object in the detection range, amplitude of movement of the object, a period of the movement of the object, a frequency shift of an echo of the radar relative to a transmit signal, a phase difference of the echo of the radar relative to the transmit signal, or an acceleration of the movement of the object.

In one embodiment, the preset condition includes one or more of the following: the speed is in a first preset range, the distance is in a second preset range, or the angle is in a third preset range.

In one embodiment, the filtering unit 3502 is configured to filter out, by using at least a third-order feedback filter from the echo data, information about an object whose speed is not in the first preset range.

In one embodiment, the target gesture includes a micro-gesture, and the micro-gesture is a gesture formed based on finger movement of a hand. Therefore, in the implementation of this application, even a subtle action of the finger of the user can be recognized. This implements accurate recognition of the micro-gesture of the user, and improves user experience.

In one embodiment, the object includes a finger of the hand. Correspondingly, the echo data includes one or more of the following: a movement speed of the finger, a relative distance between the finger and the radar, an angle of the finger in the detection range, a position of the finger in the detection range, amplitude of movement of the finger, a period of the movement of the finger, an acceleration of the movement of the finger, a frequency shift of the echo of the radar relative to the transmit signal, or a phase difference of the echo of the radar relative to the transmit signal.

In one embodiment, the apparatus further includes: a gesture detection unit 3505, configured to: before the feature extraction unit extracts the feature from the gesture data, to obtain the gesture feature information, capture, from the gesture data, data between start gesture data and end gesture data, to obtain updated gesture data.

In one embodiment, the start gesture data includes data in which a variance of a signal in the gesture data is greater than a first preset value, and the end gesture data includes data in which a variance of at least three continuous frames in the gesture data is less than a second preset value.

In one embodiment, the feature extraction unit 3503 is specifically configured to: obtain movement feature information based on the gesture data, where the movement feature information includes information generated when the object moves in the detection range of the radar; and extract the feature from the movement feature information, to obtain the gesture feature information.

In one embodiment, the movement feature information includes Doppler information, and the Doppler information includes information about Doppler effect generated when the object moves in the detection range of the radar. When obtaining the movement feature information based on the gesture data, the feature extraction unit 3503 is specifically configured to: separately perform fast Fourier transform based on a fast time dimension and perform short-time fast Fourier transform based on a slow time dimension on the gesture data, to obtain a relationship between a speed and time when the object moves in the detection range; and obtain the Doppler information based on the relationship between the speed and the time when the object moves in the detection range.

In one embodiment, the movement feature information further includes distance information and angle information, the distance information includes the distance between the object and the radar, the angle information includes the azimuth and the pitch angle of the object in the detection range of the radar. The feature extraction unit 3503 is specifically configured to: fuse at least two of the Doppler information, the distance information, and the angle information, to obtain a multi-channel feature image, where the Doppler information, the distance information, and the angle information separately correspond to one channel; and extract a feature from the multi-channel feature image by using a feature extraction network, to obtain the gesture feature information.

In one embodiment, the recognition unit 3504 is specifically configured to: obtain a correlation between a plurality of channels based on the multi-channel feature image; obtain a self-attention spectrum based on the correlation between the plurality of channels, where the self-attention spectrum indicates a similarity between features in the feature image; fuse the gesture feature information and the self-attention spectrum, to obtain a fusion feature; and recognize the fusion feature, to obtain the target gesture.

In one embodiment, the transceiver unit 3501 is further configured to send information about the target gesture to a terminal, where the information about the target gesture is used to control the terminal.

In one embodiment, the transceiver unit 3501 is further configured to obtain at least one interference gesture; and if a similarity between the target gesture and the at least one interference gesture is not greater than a preset similarity, send the information about the target gesture to the terminal.

In one embodiment, the transceiver unit 3501 is further configured to: if a confidence corresponding to the target gesture is greater than a preset confidence, send the information about the target gesture to the terminal.

In one embodiment, the transceiver unit is specifically configured to: when a similarity between the target gesture and at least one interference gesture is not greater than a preset similarity and a confidence corresponding to the target gesture is greater than a preset confidence, send the information about the target gesture to the terminal; or when a similarity between the target gesture and any interference gesture is greater than a preset similarity, or a confidence corresponding to the target gesture is not greater than a preset confidence, not send the information about the target gesture to the terminal, that is, no response is made to the target gesture.

In one embodiment, the terminal is used in a vehicle. The radar is disposed on a steering column under a steering wheel of the vehicle, the radar is disposed in front of a driver seat, the radar is disposed in front of a passenger seat, the radar is disposed between a driver seat and a passenger seat, or the radar is disposed behind a driver seat or a passenger seat. The target gesture is used to control the vehicle, and the target gesture is used to control the vehicle.

Figure 36:
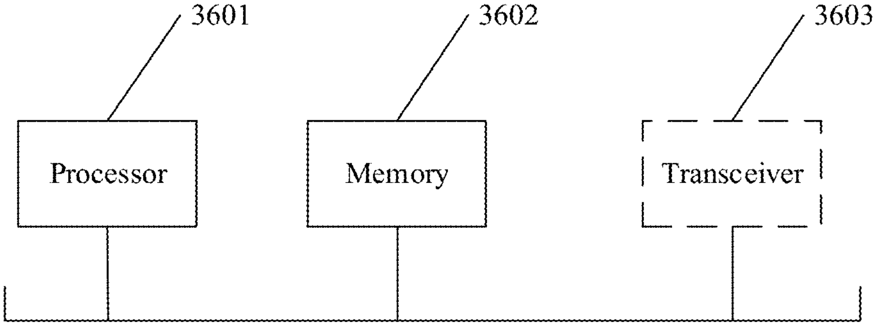
FIG. 36 is a schematic diagram of a structure of another gesture recognition apparatus according to this application.

FIG. 36 is a schematic diagram of a structure of another gesture recognition apparatus according to this application.

The gesture recognition apparatus may include a processor 3601 and a memory 3602. The processor 3601 and the memory 3602 are interconnected through a line. The memory 3602 stores program instructions and data.

The memory 3602 stores the program instructions and the data corresponding to operations corresponding to FIG. 11 to FIG. 34.

The processor 3601 is configured to perform the method operations performed by the gesture recognition apparatus shown in any one of the foregoing embodiments in FIG. 11 to FIG. 34.

In one embodiment, the gesture recognition apparatus may further include a transceiver 3603, configured to receive or send data.

An embodiment of this application further provides a computer-readable storage medium. The computer-readable storage medium stores a program used to generate a vehicle travel speed. When the program is run on a computer, the computer is enabled to perform the operations in the methods described in the embodiments shown in FIG. 11 to FIG. 34.

In one embodiment, the gesture recognition apparatus shown in FIG. 36 is a chip.

An embodiment of this application further provides a gesture recognition apparatus. The gesture recognition apparatus may also be referred to as a digital processing chip or a chip. The chip includes a processing unit and a communication interface. The processing unit obtains program instructions through the communication interface, and when the program instructions are executed by the processing unit, the processing unit is configured to perform the method operations performed by the gesture recognition apparatus in any one of the foregoing embodiments in FIG. 11 to FIG. 34.

An embodiment of this application further provides a digital processing chip. A circuit and one or more interfaces that are configured to implement functions of the processor 3601 or the processor 3601 are integrated into the digital processing chip. When a memory is integrated into the digital processing chip, the digital processing chip may complete the method operations in any one or more of the foregoing embodiments. When a memory is not integrated into the digital processing chip, the digital processing chip may be connected to an external memory through a communication interface. The digital processing chip implements, based on program code stored in the external memory, the actions performed by the gesture recognition apparatus in the foregoing embodiments.

An embodiment of this application further provides a computer program product. When the computer program product is run on a computer, the computer is enabled to perform the operations performed by the gesture recognition apparatus in the methods described in the embodiments shown in FIG. 11 to FIG. 34.

The gesture recognition apparatus in this embodiment of this application may be a chip. The chip includes a processing unit and a communication unit. The processing unit may be, for example, a processor, and the communication unit may be, for example, an input/output interface, a pin, or a circuit. The processing unit may execute computer-executable instructions stored in a storage unit, so that a chip performs the driving decision selection method described in the embodiments shown in FIG. 11 to FIG. 34. In one embodiment, the storage unit is a storage unit in the chip, for example, a register or a buffer. Alternatively, the storage unit may be a storage unit in a wireless access device but outside the chip, for example, a read-only memory (ROM), another type of static storage device that can store static information and instructions, or a random access memory (RAM).

Specifically, the processing unit or the processor may be a central processing unit (CPU), a network processor (NPU), a graphics processing unit (GPU), a digital signal processor (DSP), an application-specific integrated circuit (ASIC), a field programmable gate array (FPGA), another programmable logic device, a discrete gate, a transistor logic device, a discrete hardware component, or the like. A general-purpose processor may be a microprocessor or any regular processor or the like.

Figure 37:
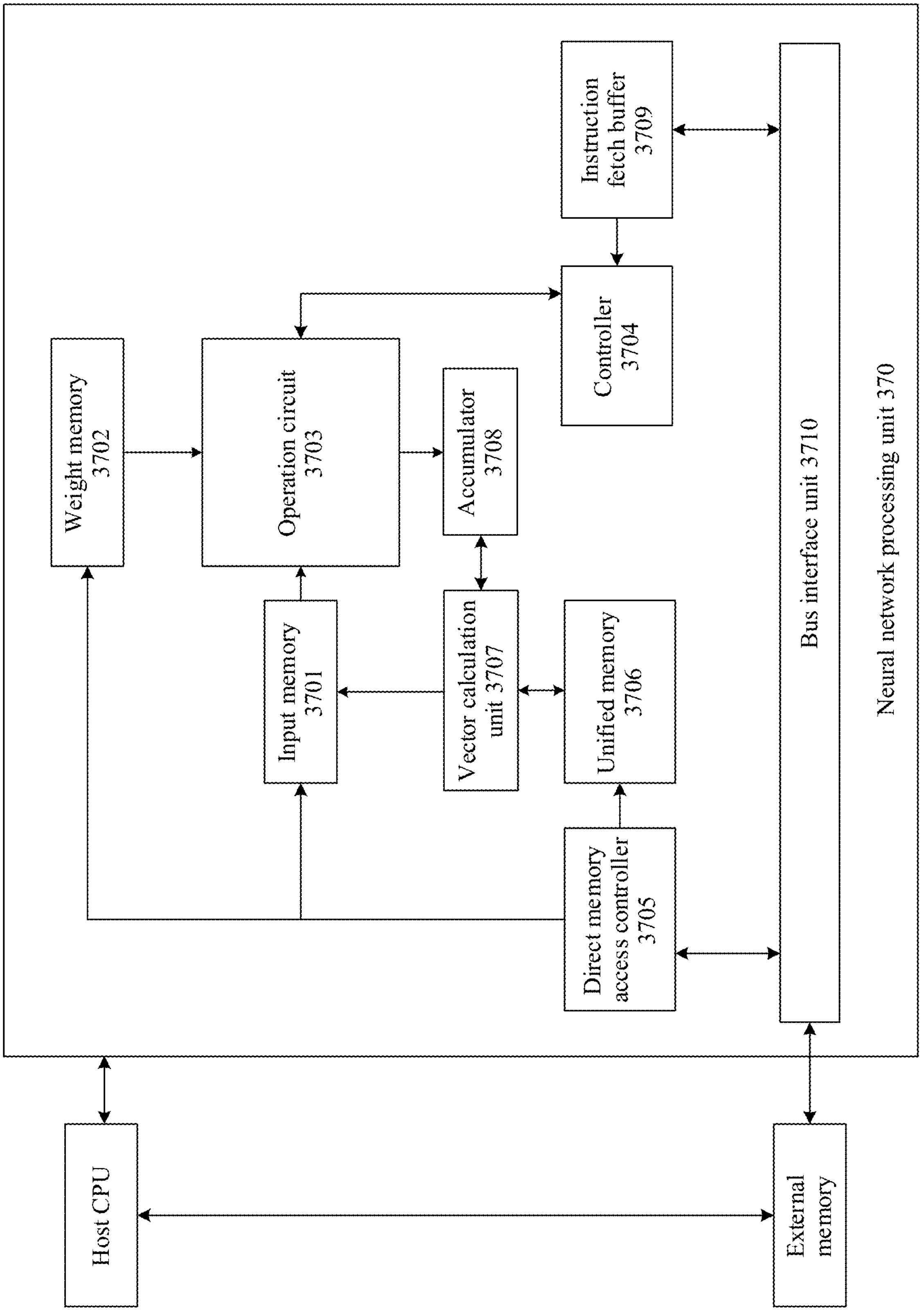
FIG. 37 is a schematic diagram of a structure of a chip according to this application.

For example, FIG. 37 is a schematic diagram of a structure of a chip according to an embodiment of this application. The chip may be represented as a neural network processing unit NPU 370. The NPU 370 is mounted to a host CPU as a coprocessor, and the host CPU allocates a task. A core part of the NPU is an operation circuit 3703, and a controller 3704 controls the operation circuit 3703 to extract matrix data in a memory and perform a multiplication operation.

In some implementations, the operation circuit 3703 includes a plurality of processing engines (PE) inside. In some implementations, the operation circuit 3703 is a two-dimensional systolic array. The operation circuit 3703 may alternatively be a one-dimensional systolic array or another electronic circuit capable of performing mathematical operations such as multiplication and addition. In some implementations, the operation circuit 3703 is a general-purpose matrix processor.

For example, it is assumed that there are an input matrix A, a weight matrix B, and an output matrix C. The operation circuit fetches, from a weight memory 3702, data corresponding to the matrix B, and caches the data on each PE in the operation circuit. The operation circuit fetches data of the matrix A from an input memory 3701, to perform a matrix operation on the matrix B, and stores an obtained partial result or an obtained final result of the matrix in an accumulator 3708.

A unified memory 3706 is configured to store input data and output data. The weight data is directly transferred to the weight memory 3702 by using a direct memory access controller (DMAC) 3705. The input data is also transferred to the unified memory 3706 by using the DMAC.

A bus interface unit (BIU) 3710 is configured to interact with the DMAC and an instruction fetch buffer (IFB) 3709 through an AXI bus.

The bus interface unit (BIU) 3710 is used by the instruction fetch buffer 3709 to obtain instructions from an external memory, and is further used by the direct memory access controller 3705 to obtain original data of the input matrix A or the weight matrix B from the external memory.

The DMAC is mainly configured to transfer input data in the external memory DDR to the unified memory 3706, or transfer the weight data to the weight memory 3702, or transfer the input data to the input memory 3701.

A vector calculation unit 3707 includes a plurality of operation processing units. For further processing is performed on an output of the operation circuit, for example, vector multiplication, vector addition, an exponential operation, a logarithmic operation, or size comparison. The vector calculation unit 1107 is mainly configured to perform network calculation at a non-convolutional/fully connected layer in a neural network, for example, batch normalization, pixel-level summation, and upsampling on a feature plane.

In some implementations, the vector calculation unit 3707 can store a processed output vector in a unified memory 3706. For example, the vector calculation unit 3707 may apply a linear function or a non-linear function to the output of the operation circuit 3703, for example, perform linear interpolation on a feature plane extracted at a convolutional layer. For another example, the linear function or the non-linear function is applied to a vector of an accumulated value to generate an activation value. In some implementations, the vector calculation unit 3707 generates a normalized value, a pixel-level summation value, or both. In some implementations, the processed output vector can be used as activation input of the operation circuit 3703, for example, to be used in a subsequent layer in the neural network.

The instruction fetch buffer 3709 connected to the controller 3704 is configured to store instructions used by the controller 3704.

The unified memory 3706, the input memory 3701, the weight memory 3702, and the instruction fetch buffer 3709 are all on-chip memories. The external memory is private for the NPU hardware architecture.

An operation at each layer in the recurrent neural network may be performed by the operation circuit 3703 or the vector calculation unit 3707.

The processor mentioned above may be a general-purpose central processing unit, a microprocessor, an ASIC, or one or more integrated circuits for controlling program execution of the methods in FIG. 11 to FIG. 34.

In addition, it should be noted that the apparatus embodiments described above are merely an example. The units described as separate parts may or may not be physically separate, and parts displayed as units may or may not be physical units, may be located in one position, or may be distributed on a plurality of network units. Some or all the modules may be selected based on an actual requirement to achieve objectives of the solutions of the embodiments. In addition, in the accompanying drawings of the apparatus embodiments provided in this application, connection relationships between modules indicate that the modules have communication connections with each other, which may be specifically implemented as one or more communication buses or signal cables.

Based on the descriptions of the foregoing implementations, a person skilled in the art may clearly understand that this application may be implemented by software in addition to necessary universal hardware, or certainly may be implemented by dedicated hardware, including a dedicated integrated circuit, a dedicated CPU, a dedicated memory, a dedicated component, and the like. Usually, any function implemented by a computer program may be easily implemented by using corresponding hardware. In addition, specific hardware structures used to implement a same function may be various, for example, an analog circuit, a digital circuit, or a dedicated circuit. However, for this application, software program implementation is a better implementation in more cases. Based on such an understanding, the technical solutions of this application essentially or the part contributing to the conventional technology may be implemented in a form of a software product. The computer software product is stored in a readable storage medium, such as a floppy disk, a USB flash drive, a removable hard disk, a read-only memory (ROM), a random access memory (RAM), a magnetic disk, or an optical disc of a computer, and includes several instructions for instructing a computer device (which may be a personal computer, a server, or a network device) to perform the methods described in embodiments of this application.

All or some of the embodiments may be implemented by using software, hardware, firmware, or any combination thereof When the software is used to implement the embodiments, all or some of the embodiments may be implemented in a form of a computer program product.

The computer program product includes one or more computer instructions. When the computer program instructions are loaded and executed on a computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (SSD)), or the like.

It should be noted that, in the specification, claims, and accompanying drawings of this application, the terms "first", "second", "third", "fourth", and so on (if existent) are intended to distinguish between similar objects but do not necessarily indicate a specific order or sequence. It should be understood that the data termed in such a way are interchangeable in proper circumstances so that embodiments described herein can be implemented in other orders than the order illustrated or described herein. In addition, the terms "include", "contain", and any other variants mean to cover the non-exclusive inclusion, for example, a process, method, system, product, or device that includes a list of operations or units is not necessarily limited to those operations or units, but may include other operations or units not expressly listed or inherent to such a process, method, system, product, or device.

What is claimed is:

1. A method of gesture recognition, comprising:

obtaining echo data of a radar, the echo data comprising information generated in response to an object moves in a detection range of the radar;

filtering out, from the echo data, information that does not meet a preset condition, to obtain gesture data, wherein the preset condition comprises a condition corresponding to at least two of a distance, a speed, or an angle, the distance comprising a distance between the object and the radar, the speed comprising a speed of the object relative to the radar, and the angle comprising an azimuth or a pitch angle of the object in the detection range of the radar;

extracting a feature from the gesture data, to obtain gesture feature information; and obtaining a target gesture based on the gesture feature information, wherein before the extracting the feature from the gesture data, to obtain the gesture feature information, the method further comprising:

capturing, from the gesture data, data between start gesture data and end gesture data, to obtain updated gesture data, wherein the start gesture data comprises data in which a variance of a signal in the gesture data is greater than a first preset value, wherein the end gesture data comprises data in which a variance of at least three continuous frames in the gesture data is less than a second preset value, wherein the variance of the signal is an echo variance calculated for each chirp signal in the gesture data, and wherein the first preset value is related to a maximum noise value of a radar signal.

2. The method according to claim 1, wherein the echo data comprises one or more pieces of the information generated in response to the object moving in the detection range of the radar, the information including:

the speed of the object relative to the radar, the distance between the object and the radar, the angle of the object in the detection range of the radar, a position of the object in the detection range, amplitude of a movement of the object, a period of the movement of the object, a frequency shift of an echo of the radar relative to a transmit signal, a phase difference of the echo of the radar relative to the transmit signal, or an acceleration of the movement of the object.

3. The method according to claim 2, wherein the preset condition comprises one or more of the speed being in a first preset range, the distance being in a second preset range, or the angle being in a third preset range.

4. The method according to claim 3, wherein, in response to the preset condition comprises that the speed is in the first preset range, the filtering out, from the echo data, information that does not meet a preset condition comprises:

filtering out, by using at least a third-order feedback filter from the echo data, information about the object whose speed is not in the first preset range.

5. The method according to claim 2, wherein the target gesture comprises a micro-gesture, and wherein the micro-gesture is a gesture formed based on a finger movement of a hand.

6. The method according to claim 5, wherein the object comprises a finger of the hand.

7. The method according to claim 1, wherein the extracting a feature from the gesture data, to obtain gesture feature information comprises:

obtaining movement feature information based on the gesture data, wherein the movement feature information comprises the information generated when the object moves in the detection range of the radar; and extracting the feature from the movement feature information, to obtain the gesture feature information.

8. The method according to claim 7, wherein the movement feature information comprises Doppler information comprising information about Doppler effect generated in response to the object moves in the detection range of the radar, and wherein the obtaining movement feature information based on the gesture data comprises:

separately performing fast Fourier transform based on a fast time dimension and performing short-time fast Fourier transform based on a slow time dimension on the gesture data, to obtain a relationship between a speed and a time in response to the object moves in the detection range; and obtaining the Doppler information based on the relationship between the speed and the time in response to the object moves in the detection range.

9. The method according to claim 8, wherein the movement feature information further comprises distance information and angle information, wherein the distance information comprises the distance between the object and the radar, wherein the angle information comprises the azimuth and the pitch angle of the object in the detection range of the radar; and wherein the extracting the feature from the movement feature information of the object, to obtain the gesture feature information comprises:

fusing at least two of the Doppler information, the distance information, and the angle information, to obtain a multi-channel feature image, wherein the Doppler information, the distance information, and the angle information separately correspond to a channel; and extracting a feature from the multi-channel feature image by using a feature extraction network, to obtain the gesture feature information.

10. The method according to claim 9, wherein the obtaining a target gesture based on the gesture feature information comprises:

obtaining a correlation between a plurality of channels based on the multi-channel feature image;

obtaining a self-attention spectrum based on the correlation between the plurality of channels, wherein the self-attention spectrum indicates a similarity between features in the multi- channel feature image;

fusing the gesture feature information and the self-attention spectrum, to obtain a fusion feature; and recognizing the fusion feature, to obtain the target gesture.

11. The method according to claim 1, further comprising:

sending information about the target gesture to a terminal to control the terminal.

12. The method according to claim 11, wherein the sending information about the target gesture to the terminal comprises:

obtaining at least one interference gesture; and in response to a similarity between the target gesture and the at least one interference gesture is not greater than a preset similarity, sending the information about the target gesture to the terminal.

13. The method according to claim 11, wherein the sending information about the target gesture to the terminal comprises:

in response to a confidence corresponding to the target gesture is greater than a preset confidence, sending the information about the target gesture to the terminal.

14. The method according to claim 13, wherein the terminal is used in a vehicle, wherein the radar is disposed on a steering column under a steering wheel of the vehicle, in front of a driver seat, t in front of a passenger seat, between a driver seat and a passenger seat, between a driver cabin and a passenger cabin on an inner roof of the vehicle, or behind a driver seat or a passenger seat, and wherein the target gesture is used to control the vehicle.

15. A apparatus for gesture recognition, comprising:

a processor; and a memory coupled to the processor to store instructions, which when executed by the processor, cause the apparatus to perform:

obtaining echo data of a radar, the echo data comprising information generated in response to an object moves in a detection range of the radar;

filtering out, from the echo data, information that does not meet a preset condition, to obtain gesture data, wherein the preset condition comprises a condition corresponding to at least two of a distance, a speed, or an angle, the distance comprising a distance between the object and the radar, the speed comprising a speed of the object relative to the radar, and the angle comprising an azimuth or a pitch angle of the object in the detection range of the radar;

extracting a feature from the gesture data, to obtain gesture feature information; and obtaining a target gesture based on the gesture feature information, wherein before the extracting the feature from the gesture data, to obtain the gesture feature information, the instructions when executed by the processor, further cause the apparatus to perform:

capturing, from the gesture data, data between start gesture data and end gesture data, to obtain updated gesture data, wherein the start gesture data comprises data in which a variance of a signal in the gesture data is greater than a first preset value, wherein the end gesture data comprises data in which a variance of at least three continuous frames in the gesture data is less than a second preset value, wherein the variance of the signal is an echo variance calculated for each chirp signal in the gesture data, and wherein the first preset value is related to a maximum noise value of a radar signal.

16. The apparatus according to claim 15, wherein the echo data comprises one or more pieces of the information generated in response the object moving in the detection range of the radar, the information including:

the speed of the object relative to the radar, the distance between the object and the radar, the angle of the object in the detection range of the radar, a position of the object in the detection range, amplitude of a movement of the object, a period of the movement of the object, a frequency shift of an echo of the radar relative to a transmit signal, a phase difference of the echo of the radar relative to the transmit signal, or an acceleration of the movement of the object.

17. The apparatus according to claim 16, wherein the preset condition comprises one or more of the speed being in a first preset range, the distance being in a second preset range, or the angle being in a third preset range.

18. A non-transitory computer readable medium having instructions stored therein, which when executed by a processor, cause the processor to perform:

obtaining echo data of a radar, the echo data comprising information generated in response to an object moves in a detection range of the radar;

filtering out, from the echo data, information that does not meet a preset condition, to obtain gesture data, wherein the preset condition comprises a condition corresponding to at least two of a distance, a speed, or an angle, the distance comprising a distance between the object and the radar, the speed comprising a speed of the object relative to the radar, and the angle comprising an azimuth or a pitch angle of the object in the detection range of the radar;

extracting a feature from the gesture data, to obtain gesture feature information; and obtaining a target gesture based on the gesture feature information, wherein before the extracting the feature from the gesture data, to obtain the gesture feature information, the instructions when executed by the processor, further cause the processor to perform:

capturing, from the gesture data, data between start gesture data and end gesture data, to obtain updated gesture data, wherein the start gesture data comprises data in which a variance of a signal in the gesture data is greater than a first preset value, wherein the end gesture data comprises data in which a variance of at least three continuous frames in the gesture data is less than a second preset value, wherein the variance of the signal is an echo variance calculated for each chirp signal in the gesture data, and wherein the first preset value is related to a maximum noise value of a radar signal.

19. The non-transitory computer readable medium according to claim 18, wherein the echo data comprises one or more pieces of the information generated in response to the object moving in the detection range of the radar, the information including:

the speed of the object relative to the radar, the distance between the object and the radar, the angle of the object in the detection range of the radar, a position of the object in the detection range, amplitude of a movement of the object, a period of the movement of the object, a frequency shift of an echo of the radar relative to a transmit signal, a phase difference of the echo of the radar relative to the transmit signal, or an acceleration of the movement of the object.

20. The non-transitory computer readable medium according to claim 19, wherein the preset condition comprises one or more of the speed being in a first preset range, the distance being in a second preset range, or the angle being in a third preset range.

* * * * *